(12) United States Patent
Häglsperger et al.

(10) Patent No.: US 12,281,695 B2
(45) Date of Patent: Apr. 22, 2025

(54) POWER SPLIT TRANSMISSION, METHOD OF OPERATING A POWER SPLIT TRANSMISSION AND MOTOR VEHICLE WITH A POWER SPLIT TRANSMISSION

(71) Applicant: DZIUBA GEARS GMBH, Trossingen (DE)

(72) Inventors: Josef Häglsperger, Gangkofen (DE); Christoph Reinhard, Augsburg (DE); Josef Bauer, Nandlstadt (DE); Robert Honzek, Oberthingau (DE)

(73) Assignee: DZIUBA GEARS GMBH, Trossingen (DE)

( * ) Notice: Subject to any disclaimer, the term of this patent is extended or adjusted under 35 U.S.C. 154(b) by 0 days.

(21) Appl. No.: 18/692,602

(22) PCT Filed: Aug. 8, 2022

(86) PCT No.: PCT/EP2022/072176
§ 371 (c)(1),
(2) Date: Mar. 15, 2024

(87) PCT Pub. No.: WO2023/041249
PCT Pub. Date: Mar. 23, 2023

(65) Prior Publication Data
US 2024/0328483 A1     Oct. 3, 2024

(30) Foreign Application Priority Data
Sep. 16, 2021 (EP) .................. 21197044

(51) Int. Cl.
*F16H 3/66* (2006.01)
*F16H 39/00* (2006.01)
*F16H 37/08* (2006.01)
*F16H 37/10* (2006.01)

(52) U.S. Cl.
CPC ....... *F16H 3/666* (2013.01); *F16H 2037/088* (2013.01); *F16H 2037/103* (2013.01); *F16H 2039/005* (2013.01)

(58) Field of Classification Search
CPC ......... F16H 2037/103; F16H 2037/088; F16H 3/56–3/666; F16H 3/18;
(Continued)

(56) References Cited

U.S. PATENT DOCUMENTS 6,440,026 B1 * 8/2002 Johnson .................. F16H 47/04
475/81
6,761,658 B1 * 7/2004 Stettler, Jr. .............. F16H 47/04
475/80
(Continued)

FOREIGN PATENT DOCUMENTS

AT         520217 A4    2/2019
DE   10 2010 003 945 A1    1/2011
(Continued)

OTHER PUBLICATIONS

International Search Report and Written Opinion for International Application No. PCT/EP2022/072176, dated Nov. 3, 2022, 17 pages.
(Continued)

*Primary Examiner* — Ernesto A Suarez
*Assistant Examiner* — Lillian T Nguyen
(74) *Attorney, Agent, or Firm* — Seed IP Law Group LLP

(57) ABSTRACT

A power split transmission has a drive shaft with a first mechanical branch comprising a planetary gear arrangement with at least two sun gears, a first ring gear and a planetary web, on which double planetary gears are arranged, which mesh with the sun gears and with the first ring gear, at least one of the sun gears being coupled to the drive shaft, with a continuously adjustable second branch, which can be (Continued)

connected at least partially to the first, mechanical branch via the planetary gear arrangement and comprises at least two adjustable hydraulic units which can be energetically coupled to one another and can be operated in each case in both directions as a motor or pump, and with an output shaft which can be coupled to the drive shaft via the first, mechanical branch and the second branch, the planetary gear arrangement being assigned a planetary reversing gear by means of which the direction of rotation of the first, mechanical branch can be reversed.

15 Claims, 21 Drawing Sheets

(58) Field of Classification Search
CPC .................. F16H 2200/202–2200/2028; F16H 2200/0082; F16H 2039/005
See application file for complete search history.

(56) References Cited

U.S. PATENT DOCUMENTS

| | | |
|---|---|---|
| 7,892,130 B1 | 2/2011 | Gollner et al. |
| 9,423,013 B2 * | 8/2016 | Nitsch ................... F16H 37/046 |
| 11,480,238 B1 * | 10/2022 | Profumo ............... F16H 37/084 |
| 2008/0032846 A1 * | 2/2008 | Heinzelmann ........ F16H 37/042 475/207 |
| 2011/0015022 A1 * | 1/2011 | Stoeckl .................. B60K 6/442 475/83 |

FOREIGN PATENT DOCUMENTS

| | | |
|---|---|---|
| DE | 10-2010-003944 A1 | 12/2011 |
| DE | 10 2010 053 012 A1 | 6/2012 |
| WO | 02/27214 A1 | 4/2002 |
| WO | WO 2006042434 A1 | 4/2006 |
| WO | 2009/047035 A1 | 4/2009 |
| WO | WO 2016102572 A1 | 6/2016 |

OTHER PUBLICATIONS

Extended European Search Report for European Application No. 21197044.7, dated Feb. 18, 2022, 11 pages.
Communication pursuant to Article 94(3) for 21197044.7, dated Nov. 15, 2023, 7 pages.
Communication pursuant to Article 94(3) for 21197044.7, dated Mar. 19, 2024, 5 pages.

* cited by examiner

POWER SPLIT TRANSMISSION, METHOD OF OPERATING A POWER SPLIT TRANSMISSION AND MOTOR VEHICLE WITH A POWER SPLIT TRANSMISSION

BACKGROUND

Technical Field

The invention relates to a power split transmission.

Furthermore, the invention relates to methods for operating a power split transmission and to a motor vehicle with a power split transmission.

Description of the Related Art

When combustion engines are used in motor vehicles, it is necessary to couple them with transmissions in order to be able to operate the combustion engines at their favorable operating points over a wide speed range. An example of this is tractors for agricultural use, where the speed in the field may only reach 0.4 km/h in some cases for manual planting, while speeds of 60 km/h or higher are desired for transfer between the field and the farm. In transmissions with a given number of gears, the operation of the engine in its optimum range is not continuously guaranteed, so that the need arose very early on to achieve a continuous change in the transmission ratio in order to be able to offer a vehicle speed independent of the engine speed.

WO 2006/042434 A1 discloses a power split transmission suitable for use in agricultural vehicles, wherein a stepped planetary gear is provided between the drive shaft coupled to the internal combustion engine and an output shaft for splitting the power applied to the drive shaft into a mechanical power branch and a hydraulic power branch. The hydraulic power branch is formed by two identical hydrostatic axial piston machines that are hydraulically connected to each other, which can be operated either as a pump or a motor and can be swiveled in a predetermined swivel angle range. The two hydrostatic axial piston machines can be connected to the drive shaft or the stepped planetary gearbox in different ways via two clutches as hydraulic units to cover different travel ranges or travel stages. The two hydraulic units are designed as wide-angle hydrostats.

This publication can be used as a reference for the knowledge of the average person skilled in the art, as it explains in detail how the power split transmission and the wide-angle hydrostats are used in work.

However, a disadvantage of this power split transmission is that the reverse travel has a poor efficiency. In WO 2016/102572 A1, a reversing stage is therefore provided between the input shaft and the output shaft for changing between a forward travel range and a reverse travel range, whereby the reversing stage either reverses all the directions of rotation of the sun wheels of the ring gear and the web shaft of the planetary gear arrangement when changing between the forward travel range and the reverse travel range or keeps them all constant. When changing between the forward travel range and the reverse travel range, the relative directions of rotation of the sun gears, the ring gear and the web shaft are therefore kept in the same direction, so that not individual components of the planetary gear arrangement are reversed while other components are not reversed, so that it is ruled out that the directions of rotation are superimposed when changing between the forward and reverse travel ranges in the planetary gear arrangement. The reversing stage comprises two clutch elements between one output side of the planetary gear arrangement and the output shaft, whereby torque is transmitted via the first clutch element in the forward travel range and torque is transmitted via the second clutch element in the reverse travel range.

BRIEF SUMMARY

Some embodiments relate to a power split transmission with a drive shaft, with a first, mechanical branch which comprises a planetary gear arrangement with at least two sun gears, a first ring gear and a planetary web, on which double planetary gears are arranged which mesh with the sun gears and with the first ring gear, at least one of the sun gears being coupled to the drive shaft, with a continuously variable second branch, which can be connected at least partially to the first, mechanical branch via the planetary gear arrangement and comprises at least two adjustable hydraulic units, which can be energetically coupled to one another and can be operated in both directions as a motor or pump, and with an output shaft, which can be coupled to the drive shaft via the first, mechanical branch and the second branch. A planetary reversing gear is assigned to the planetary gear arrangement, by means of which the direction of rotation of the first, mechanical branch can be reversed.

Some embodiments provide a power split transmission whose structure is simplified and does not require clutches on the output side of the planetary gear arrangement. Some embodiments provide a method for operating a power split transmission both for the reverse driving range and for the forward driving range and a motor vehicle with a power split transmission.

The above-mentioned power split transmission is characterized by the fact that the directions of rotation of the components of the planetary gearbox arrangement with its sun gears, the ring gear and the web shaft are maintained for both the forward travel range and the reverse travel range, and a planetary reversing gearbox is used to reverse the direction of rotation of the planetary gearbox arrangement when changing between the forward travel range and the reverse travel range, so that the output shaft is driven in the correct direction of rotation. It is not necessary to use clutches for this, which reduces the complexity of the power split transmission, simplifies the application and also saves installation space, resulting in a simple and compact power split transmission in which the reverse travel range is driven in the same way as the forward travel range without reactive power being generated.

If the planetary reversing gear has an axially adjustable shift sleeve, in one axial position of which the direction of rotation of the planetary web can be transmitted directly to the first, mechanical branch and in the other axial position of which the direction of rotation of the planetary web can be fed in reverse to the first, mechanical branch, the compactness of the structure is promoted, whereby it is then suitable for the shift sleeve to be blocked against rotation relative to a gear housing in one of the axial positions.

It is also advantageous if the shift sleeve is formed as a reversible hollow gear with a reversible planet with an associated odd number of gears, the radially inner gear of the shift sleeve being connected to the first mechanical branch in a rotationally fixed manner by a coupling shaft. This results in a very compact design, whereby in one axial position of the shifting sleeve it is secured against rotation by being fixed in relation to the gearbox housing and thus the gear wheel in contact with the shifting sleeve, which is formed as a reversible hollow gear, rotates on the reversible hollow gear and thus the direction of rotation is reversed compared to the other case in the other axial position, when the reversible hollow gear rotates with the planetary gear arrangement as a whole without being blocked in rotation.

It is also envisaged that the coupling shaft is designed as a hollow shaft and surrounds a journal shaft connected to the drive shaft.

It is also envisaged that the first, mechanical branch is connected or connectable in the direction of the power flow downstream of the planetary reversing gear and the second branch is connected or connectable via a first clutch to a summing shaft which is connected to the drive shaft. In this way, the use of the hydrostatic branch of the power split transmission is ensured, whereby it should also be noted here that the power of the mechanical branch and the hydrostatic branch is combined via the summing shaft, whereby a clutch is conventionally assigned to the hydrostatic branch, however, no clutch is required on the output side of the planetary gearbox arrangement due to the planetary reversing gearbox in order to enable the power flow to the summing shaft, i.e., the power transmission chain between the summing shaft and the output shaft is formed free of coupling elements, so that a very compact structure is also present in this area.

The first, mechanical branch is connected on the output side of the coupling shaft via an odd number of gears with the summing shaft. It is also advantageous if a second clutch is assigned to the second branch, as this allows a second travel range to be provided in which power is only supplied to the summing shaft via the planetary gear.

Advantageously, the first clutch is designed as a claw clutch assigned to the summing shaft for detachable interaction with a hydrostatic shaft of the second hydraulic unit.

If the second clutch is assigned to the hydrostatic shaft of the second hydraulic unit and is designed as a double claw clutch for interaction of the second hydrostatic unit via a first gear transmission with the sun gear in the first closed position and for interaction via a second gear transmission with the sun gear in the second closed position, then there are equivalent conditions for the forward travel range and the reverse travel range, which can each be operated in two stages with the same speed range.

In the second stage, an additional gear stage can be provided to extend the range of use of the power split transmission by arranging the additional gear stage between the gear wheel assigned to the coupling shaft and the adjacent gear wheel, which detachably couples a first supplementary gear wheel assigned to the coupling shaft to the adjacent gear wheel via two clutches and a second supplementary gear wheel and a third supplementary gear wheel.

A method for operating a power split transmission of this type is characterized in that, in a forward driving range, the shift sleeve is displaced into an axial position which is not fixed in terms of rotation relative to the transmission housing, in that the first hydraulic unit is coupled to the ring gear via a gear wheel Z5 and a gear wheel Z4 on an outer ring of the ring gear, in that the second hydraulic unit is coupled to a summing shaft via a first clutch, a gear wheel Z9 and a gear wheel Z10, in that the first hydraulic unit is pivoted from a pivoting position with a pivoting angle of 0° in a first pivoting direction into a positive angular range and is operated as a pump, and in that the second hydraulic unit is operated as a motor. In this configuration with the implementation of the process steps, a start-up in the forward direction takes place in a stage 1, whereby the hydrostatically transmitted proportion is initially 100% and then decreases to 0% until the first hydraulic unit has reached its maximum swivel angle.

It is then also possible to carry out process steps in which the first hydraulic unit is operated as a motor and the second hydraulic unit as a pump in a second stage of the forward travel range, whereby the second hydraulic unit is coupled to the sun gear via a second clutch and a first gear transmission and is swiveled from a swivel position of 0° into a negative angle range.

Also provided is a method for operating a power split transmission in which, in a reverse travel range, the shift sleeve is adjusted to the axial position in which the shift sleeve is fixed in terms of rotation relative to the transmission housing, wherein the first hydraulic unit is operated as a pump and the second hydraulic unit is operated as a motor, and wherein the first hydraulic unit is pivoted from a pivoting position of 0° into a second pivoting direction in a negative angular range, so that the direction of rotation of the second hydraulic unit is reversed. To the summing shaft is thus transmitted torque with the correct direction of rotation via both the first, mechanical branch and the second, hydrostatic branch.

It is also possible to carry out process steps for the reverse travel range in which the first hydraulic unit is operated as a motor and the second hydraulic unit as a pump in a second stage of the reverse travel range, whereby the second hydraulic unit is coupled to the sun gear via a second clutch and a second gear transmission and is swiveled from a swivel position of 0° into a negative angle range.

As a result, the forward travel range and the reverse travel range of the power split transmission are formed equally, as the direction of rotation of the mechanical power branch is reversed by the planetary reversing gearbox. Both travel ranges are each formed with two travel stages, which can be supplemented by a further gear stage if required. In the first stage, the hydrostatic power share is 100% at the starting point both in forward travel and in reverse travel and decreases to 0% with increasing speed, whereby the hydraulic power branch and the mechanical power branch are combined via the summing shaft. In the second stage, the hydraulic power branch and the mechanical power branch are combined in the planetary gear arrangement, whereby the hydraulic power share is between 0% and 29%.

The above-mentioned advantages and effects also apply mutatis mutandis to a motor vehicle with such a power split transmission.

The features and combinations of features mentioned above in the description as well as the features and combinations of features mentioned below in the description of the figures and/or shown alone in the figures can be used not only in the combination indicated in each case, but also in other combinations or on their own, without going beyond the scope of the invention. Thus, embodiments which are not explicitly shown or explained in the figures, but which emerge from the explained embodiments and can be produced by separate combinations of features, are also to be regarded as being comprised by the invention and disclosed.

BRIEF DESCRIPTION OF THE SEVERAL VIEWS OF THE DRAWINGS

Further advantages, features and details of the invention are apparent from the claims, the following description of embodiments and from the drawings.

DETAILED DESCRIPTION

Figure 1:
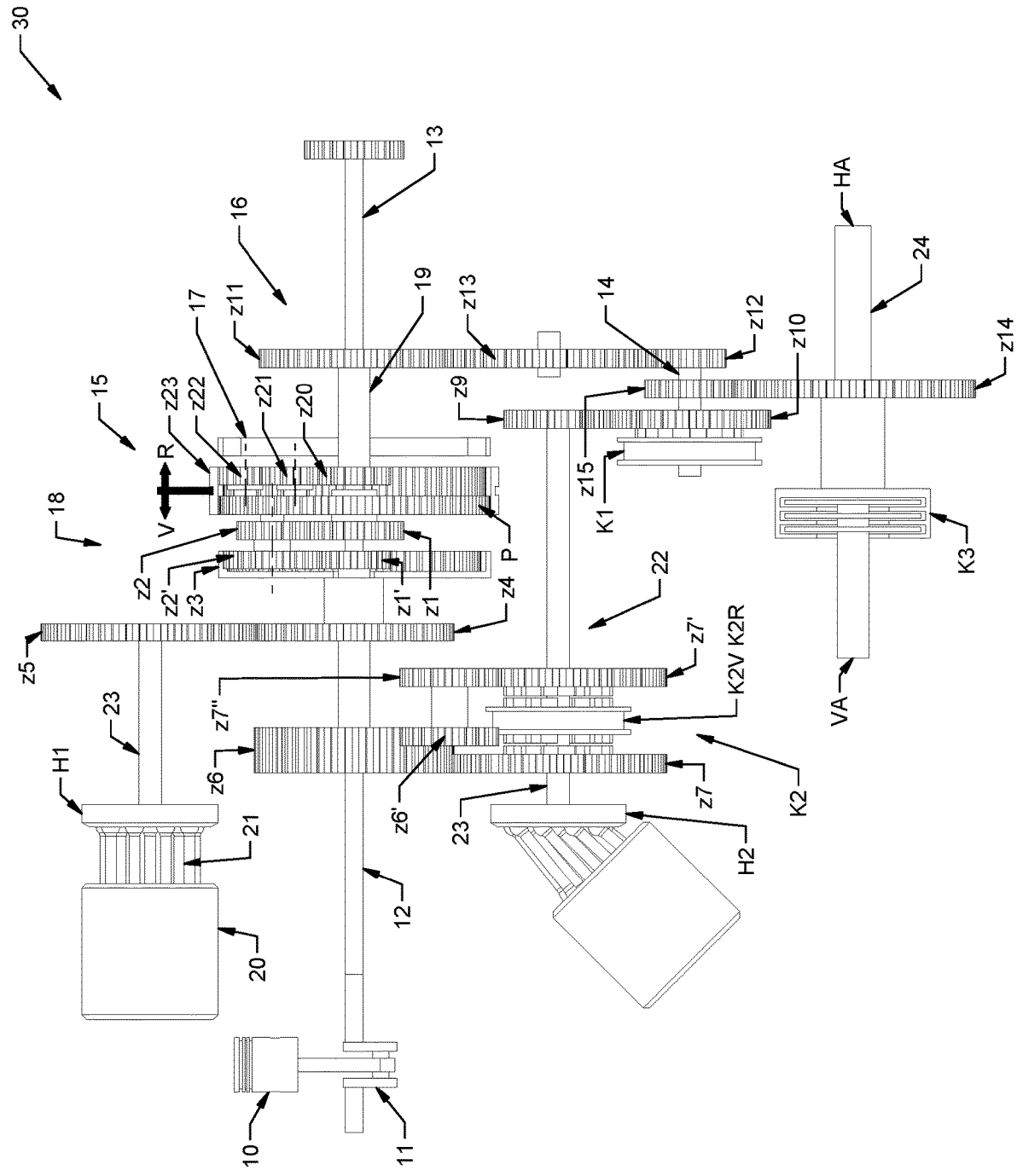
FIG. 1 is a model representation of a power split transmission.
Figure 2:
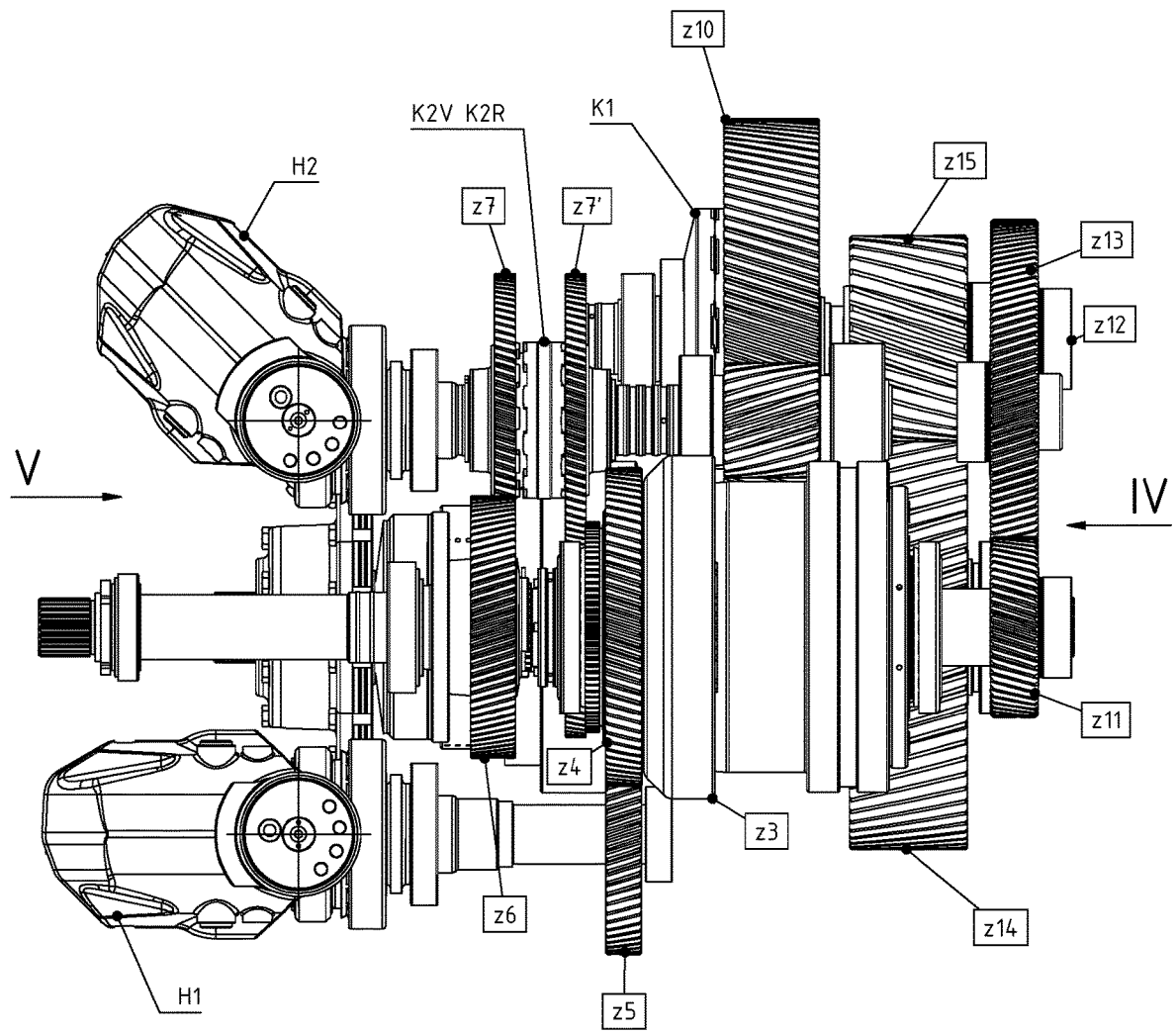
FIG. 2 is a top view of a constructive embodiment of the model representation of the power split transmission of FIG. 1.
Figure 3:
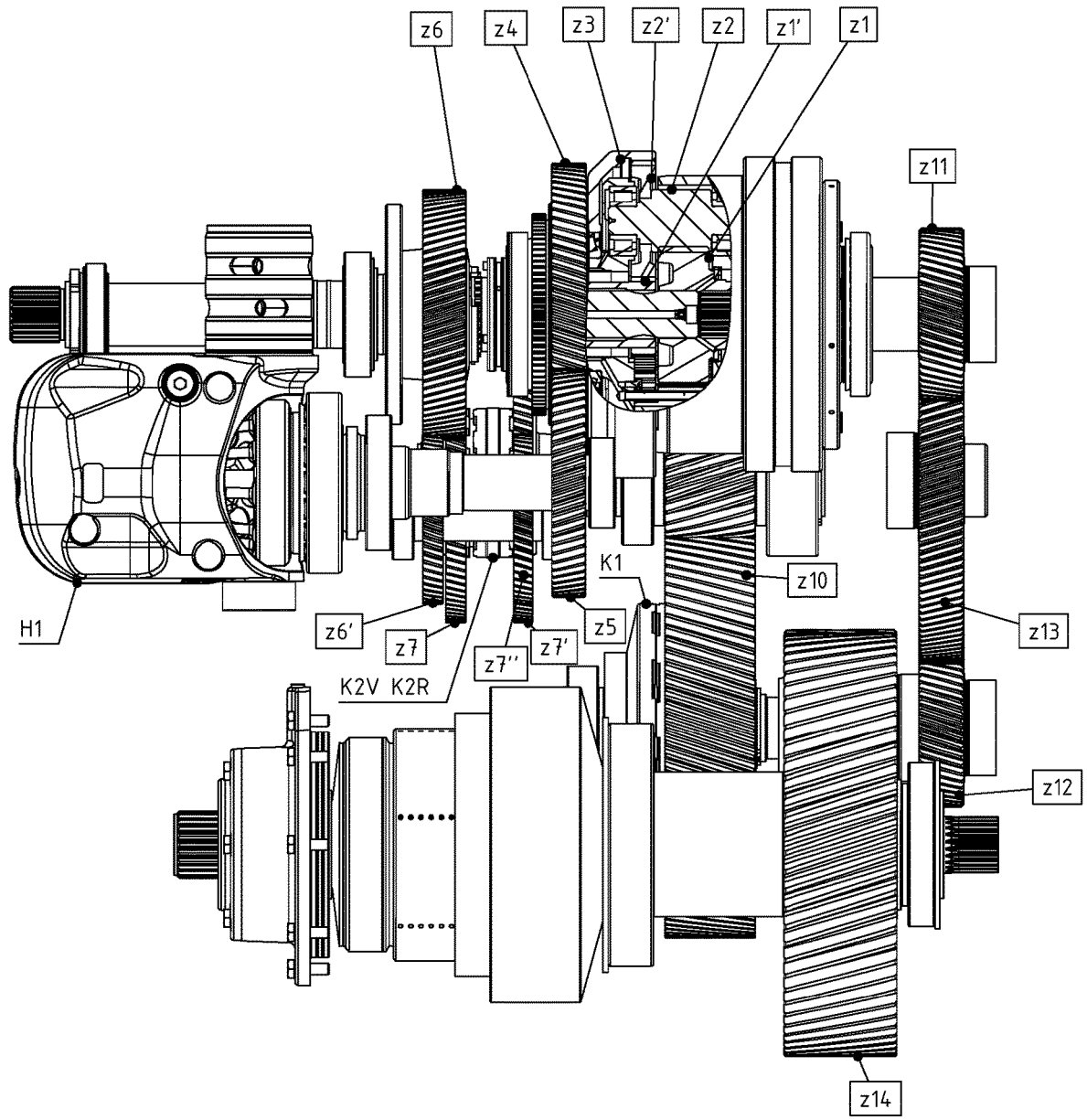
FIG. 3 is a side view of the power split transmission from FIG. 2, shown partially cut in the area of the planetary gear arrangement.
Figure 4:
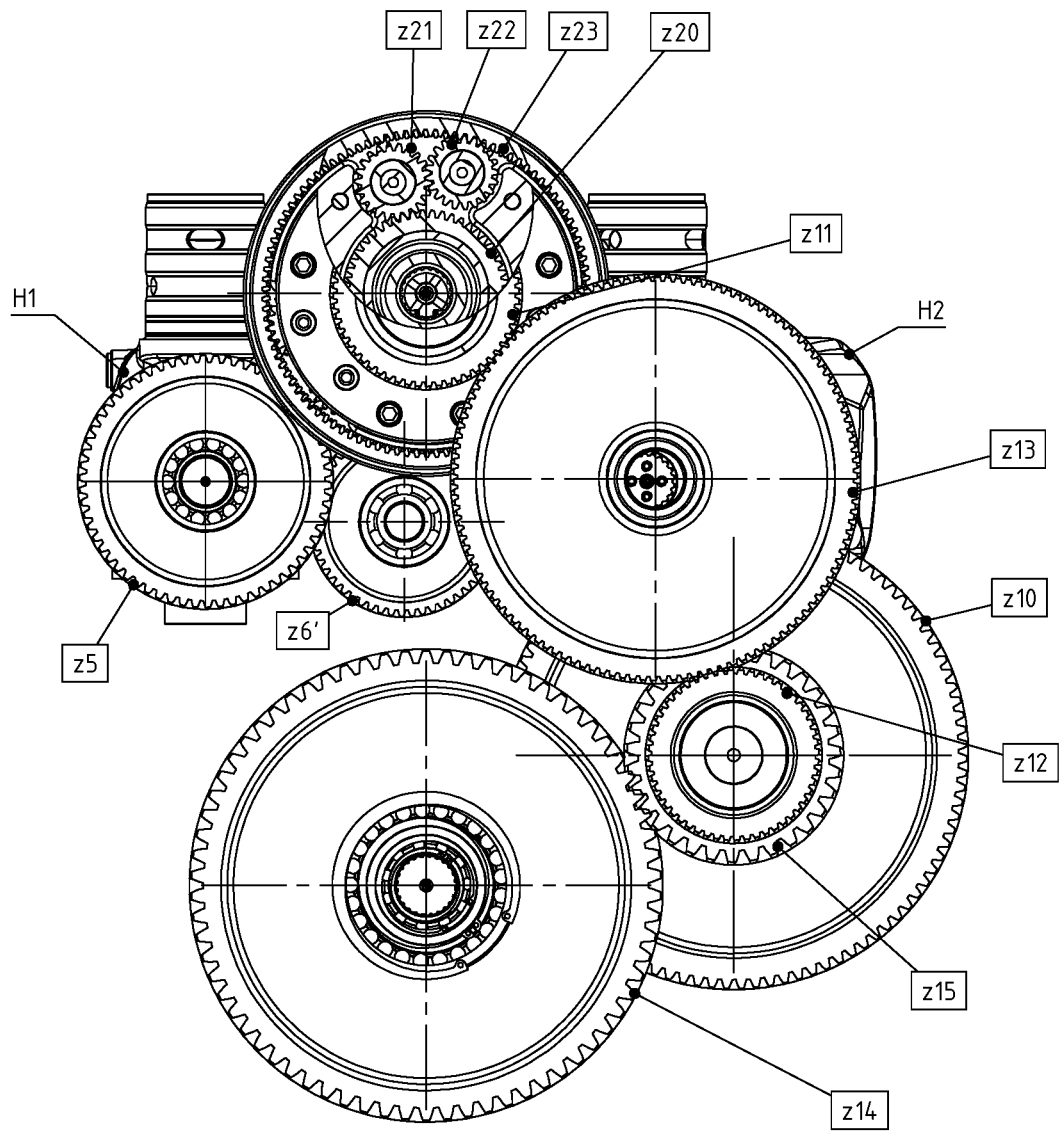
FIG. 4 is a view from the direction of arrow IV from FIG. 2, shown partially cut in the area of the second ring gear of the planetary reversing gear.
Figure 5:
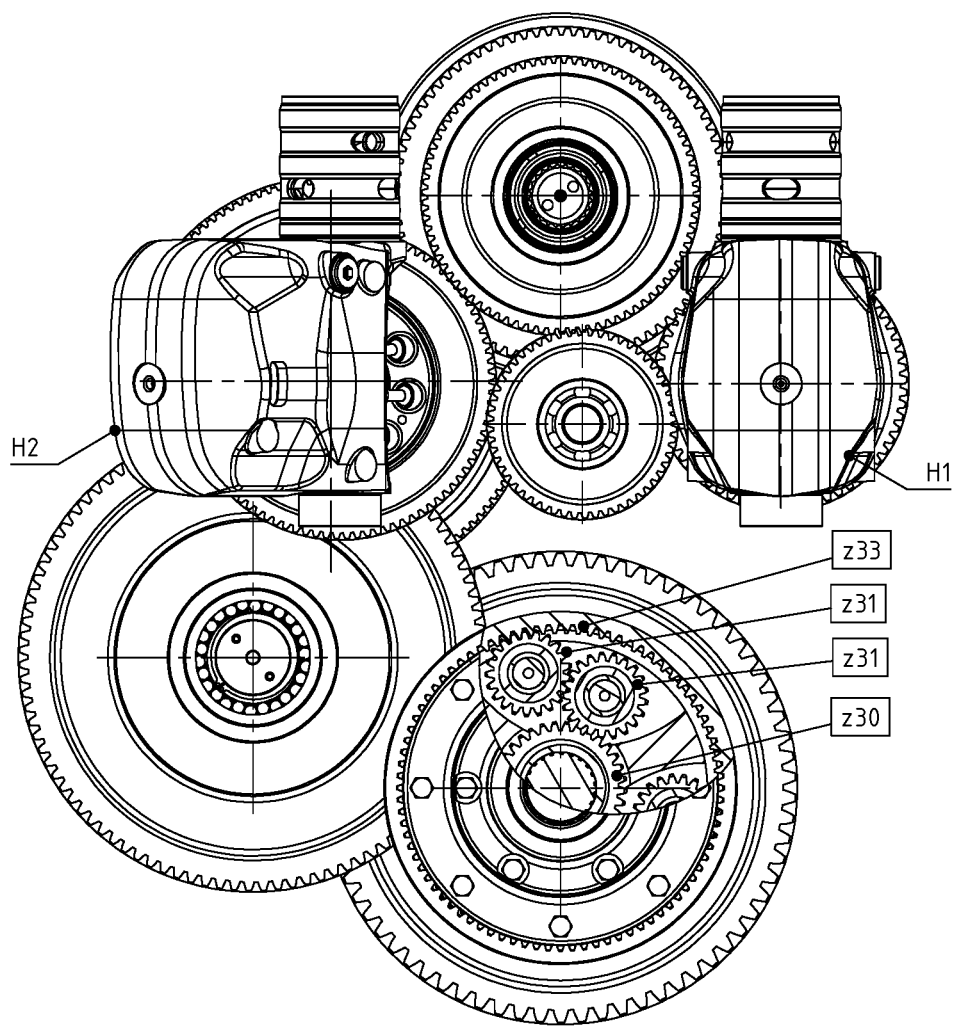
FIG. 5 is a view from the direction of arrow V from FIG. 2, shown partially cut in the area of a differential lock assigned to the output shaft.

FIG. 1 shows a three-dimensional model representation of a power split transmission 30, which is coupled with its drive shaft 12 to an internal combustion engine, which is symbolized by a piston 10 connected to a crankshaft 11. The drive shaft 12 can also be connected to the combustion engine via a torsion damper not shown in the drawing and a cardan shaft not shown.

The drive shaft 12 is connected to a journal shaft 13 extending through the power split transmission 30, with which further components can be driven. If, for example, the power split transmission 30 is used in a motor vehicle designed as a tractor for agricultural use, a pump for the working hydraulics and a further pump for the steering can be driven via the power journal shaft 13; it is also possible to drive other units.

The power split transmission 30 has a planetary gear arrangement 18 with a large sun gear $Z1$ and a small sun gear $Z1'$. Furthermore, there are double planetary gears $Z2$ and $Z2'$, a first ring gear $Z3$ and a planetary web P. A first mechanical branch 16 runs via this planetary gear arrangement 18, through which the power provided by the internal combustion engine via the drive shaft 12 can be fed to a summing shaft 14 and from this to an output shaft 24.

FIGS. 2 to 5 show the design implementation of the schematic illustration of the power split transmission 30 from FIG. 1.

As a special feature of the power split transmission 30, a planetary reversing gear 15 is provided on the output side of the planetary gear arrangement 18 for easy changeover between a forward travel range V and a reverse travel range R. The direction of rotation of the first mechanical branch 16 can be reversed by this planetary reversing gear 15. The planetary reversing gear 15 comprises an axially adjustable shift sleeve $Z23$ formed as a reversing hollow gear, which in a first axial position transmits the direction of rotation of the planetary web P directly to a reversing planet $Z22$, $Z21$, $Z20$, which is connected by force to the summing shaft 14 via three gear wheels $Z11$, $Z12$ and $Z13$ in the first mechanical branch 16.

In a second axial position, the shift sleeve $Z23$ is directly or indirectly blocked against rotation with respect to a gear housing 17 of the power split transmission 30, so that the direction of rotation of the planetary web P is reversed in this axial position and acts on the summing shaft 14 with a reversed direction of rotation. For this purpose, the indexing sleeve $Z23$ has a reversing planet $Z20$, $Z21$, $Z22$ with an assigned odd number of gearwheels, whereby the radially inner gear wheel $Z20$ is non-rotatably connected to the gear wheels $Z11$, $Z12$, $Z13$ by a coupling shaft 19 with the first, mechanical branch 16. The coupling shaft 19 is designed as a hollow shaft and surrounds the journal shaft 13.

The power split transmission 30 also has two hydraulic units H1 and H2, which form a hydraulic, continuously variable second branch 22 of the power split transmission 30. The two hydraulic units H1, H2 are hydraulically connected to each other via high-pressure lines not shown.

The hydraulic units H1 and H2 are formed by wide-angle hydrostats of the bent-axis type, in which a cylinder block 20 with pistons 21 located therein can be swiveled out of the axis of the associated hydrostat shaft 23 to one side by a swivel angle. The basic structure and mode of operation of the wide-angle hydrostats is described in WO 2006/042434 A1 and is known therefrom.

If the hydrostat shaft 23 and thus also the cylinder block 20 are rotated around their respective axes via a synchronizing shaft at a constant swivel angle not equal to 0°, each of the pistons 21 runs through a complete stroke cycle per revolution.

A hydraulic unit H1, H2 can operate as a hydraulic pump PU if it is driven via the hydrostatic shaft 23 and a hydraulic medium is sucked in by the pistons 21 moving out of the cylinder bore and pushed out by the pistons 21 moving into the cylinder bore. The larger the swivel angle, the greater the pumping capacity in volume per revolution.

A hydraulic unit H1, H2 can also operate as a hydraulic motor M if the cylinders are each pressurized with a hydraulic medium and the resulting rotary motion is taken from the hydrostatic shaft 23. The greater the swivel angle, the greater the torque.

The operating mode of the hydraulic units H1, H2 is also noted in the figures; the same applies to the shift positions V, R of the planetary reversing gear 15 and the shift positions K2V and K2R of the double claw clutch K2V/K2R.

The drive shaft acts on the first hydraulic unit H1 via the gear wheel Z4 on the outer ring of the ring gear Z3 and the gear wheel Z5.

In the forward travel range V and in the reverse travel range R of stage 1, the second hydraulic unit H2 is coupled via the first clutch K1 and gear wheels Z9 and Z10 to the summing shaft 14, which is connected via the gear wheels Z15 and Z14 to the output shaft 24, which in the embodiment example is used to drive a rear axle HA and can also be used to drive a front axle VA via a third clutch K3.

In the embodiments shown in FIGS. 1 to 19, the first clutch K1 is designed as a claw clutch assigned to the summing shaft 14 for detachable interaction with a hydrostatic shaft 23 of the second hydraulic unit H2. Furthermore, the second clutch K2 is assigned to the hydrostatic shaft 23 of the second hydraulic unit H2 and is designed as a double claw clutch K2V/K2R for the interaction of the hydrostatic unit H2 via a first gear transmission Z6, Z7 with the sun gear Z1' in the first closed position K2V, which is assigned to the forward travel range, and for cooperation via a second gear transmission Z7', Z7'', Z6', Z6 with the sun gear Z' in the second closed position K2R, which is assigned to the reverse travel range.

FIGS. 15 to 19 indicate that an additional gear stage 31 can be arranged between the gear wheel Z11 assigned to the coupling shaft 19 and the adjacent gear wheel Z13, which detachably couples a first supplementary gear wheel Z11' assigned to the coupling shaft 19 to the adjacent gear wheel Z13 via two clutches KS, KL and a second supplementary gear wheel Z11'S and a third supplementary gear wheel Z11L.

Figure 19:
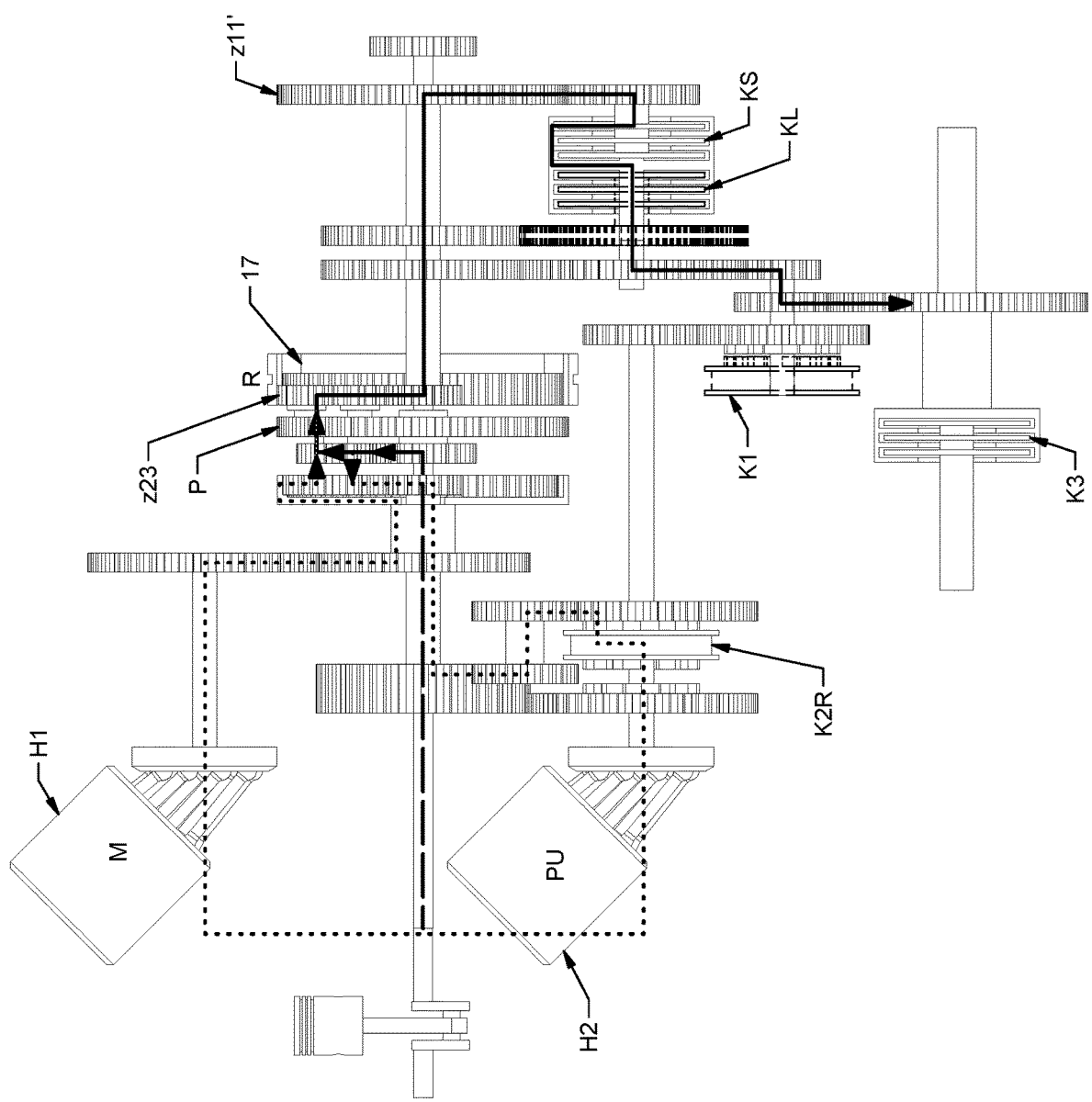
FIG. 19 is a symbolic illustration corresponding to FIG. 6, of the force flow in the closed force transmission chains according to FIG. 18a).
Figure 20:
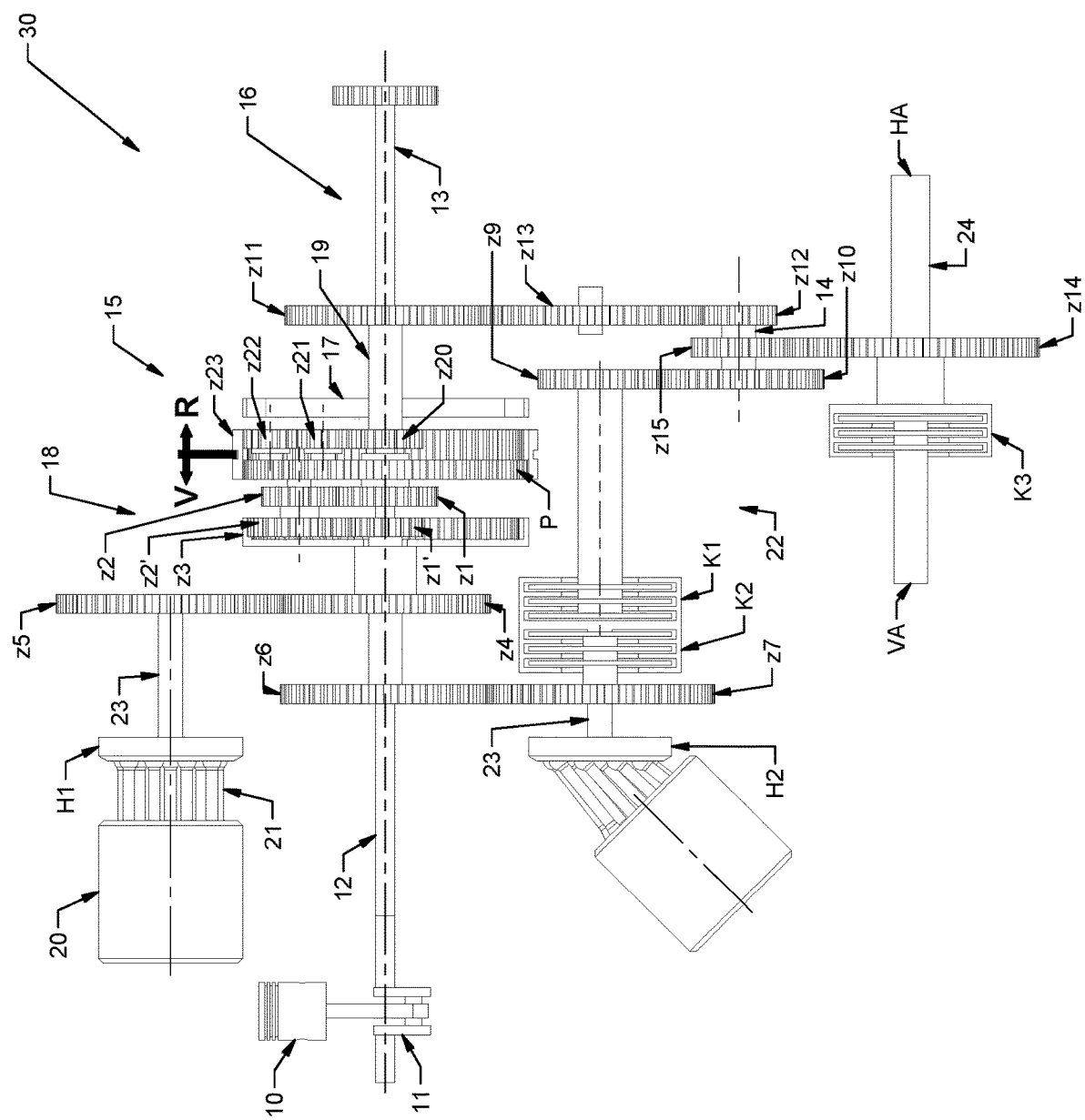
FIG. 20 is an illustration of an embodiment corresponding to FIG. 1 with first clutch and second clutch designed as multi-plate clutches.

In the design examples shown in FIGS. 1 to 19, the clutches K1 and K2 are formed as claw clutches and K3 as a multi-plate clutch, while FIG. 20 shows the use of multi-plate clutches for clutches K1 and K2, which is also possible in principle, but is associated with the loss of the second stage for the reverse travel range R.

The second hydraulic unit H2 can therefore be coupled to the summing shaft 14 via the first clutch K1 and, when the first clutch K1 is open, can be coupled to the planetary gear arrangement 18 by means of the second clutch K2 via the first gear reduction gearing Z6, Z7 or the second gear reduction gearing Z7', Z7', Z6', Z6' and the small sun gear Z1'. The possible operating modes of the power split transmission 30 with the structure described above are explained below.

One possible operating mode is active standstill, in which the summing shaft 14 and, therethrough the output shaft 24 are blocked and a type of "parking brake" is present. For this purpose, the second hydraulic unit H2 is fully swiveled out, as shown in FIG. 1, while the first hydraulic unit H1 has a swivel angle of 0°. The first hydraulic unit H1 acts as a pump PU and the second hydraulic unit H2 as a motor M, so that the desired blockage is achieved via the second hydraulic unit H2 and the first clutch KL.

Figure 6:
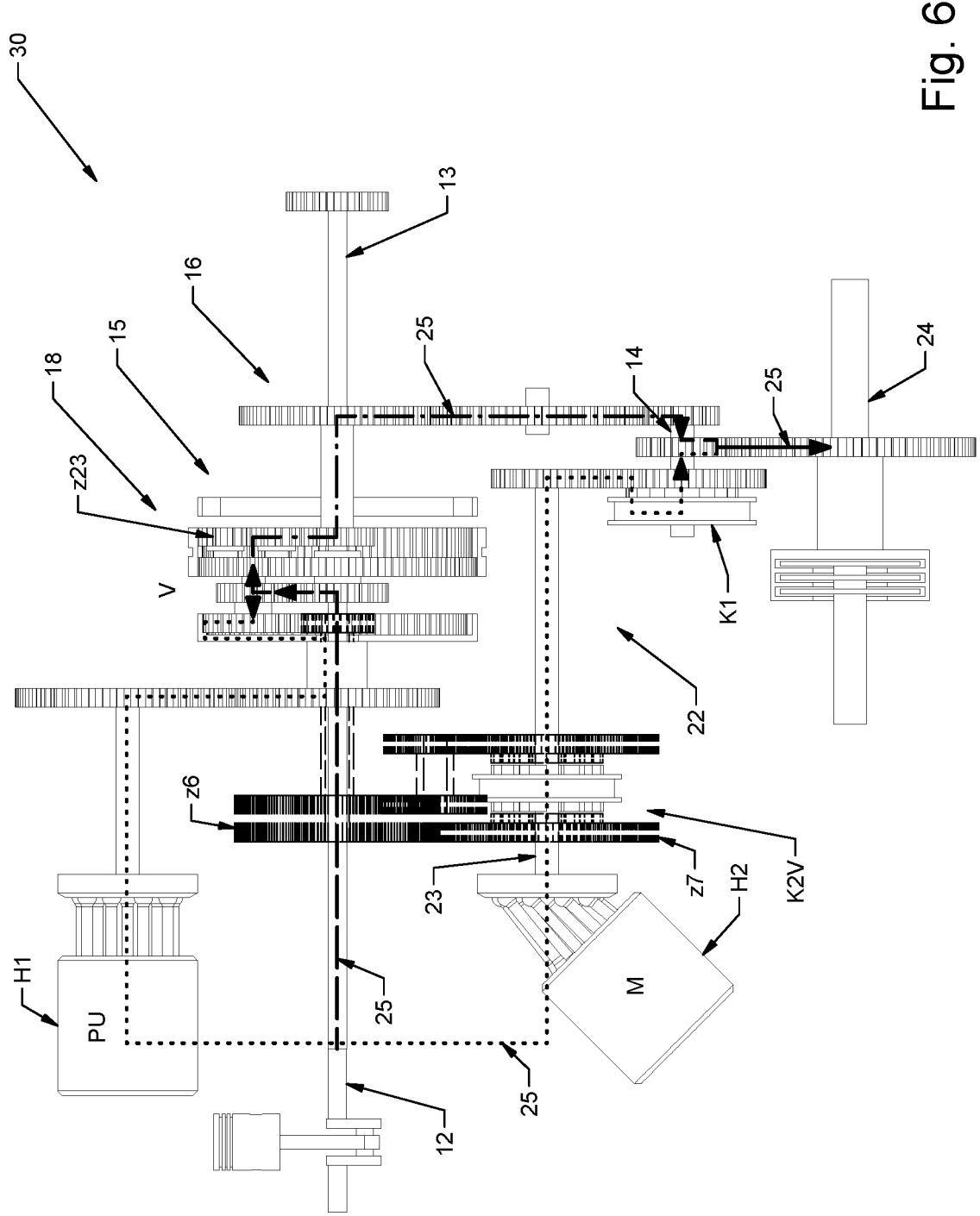
FIG. 6a is an illustration corresponding to FIG. 1, with the corresponding swivel angle of the two hydraulic units for starting in a forward driving range and the symbolic representation of the power flow in the closed power transmission chains, with the dashed representation for the power at the transmission input with the input shaft, the dotted representation for the hydraulically transmitted power, the dot-dashed representation for the mechanically transmitted power and the solid representation for the power at the transmission output with the output shaft.
Figure 7:
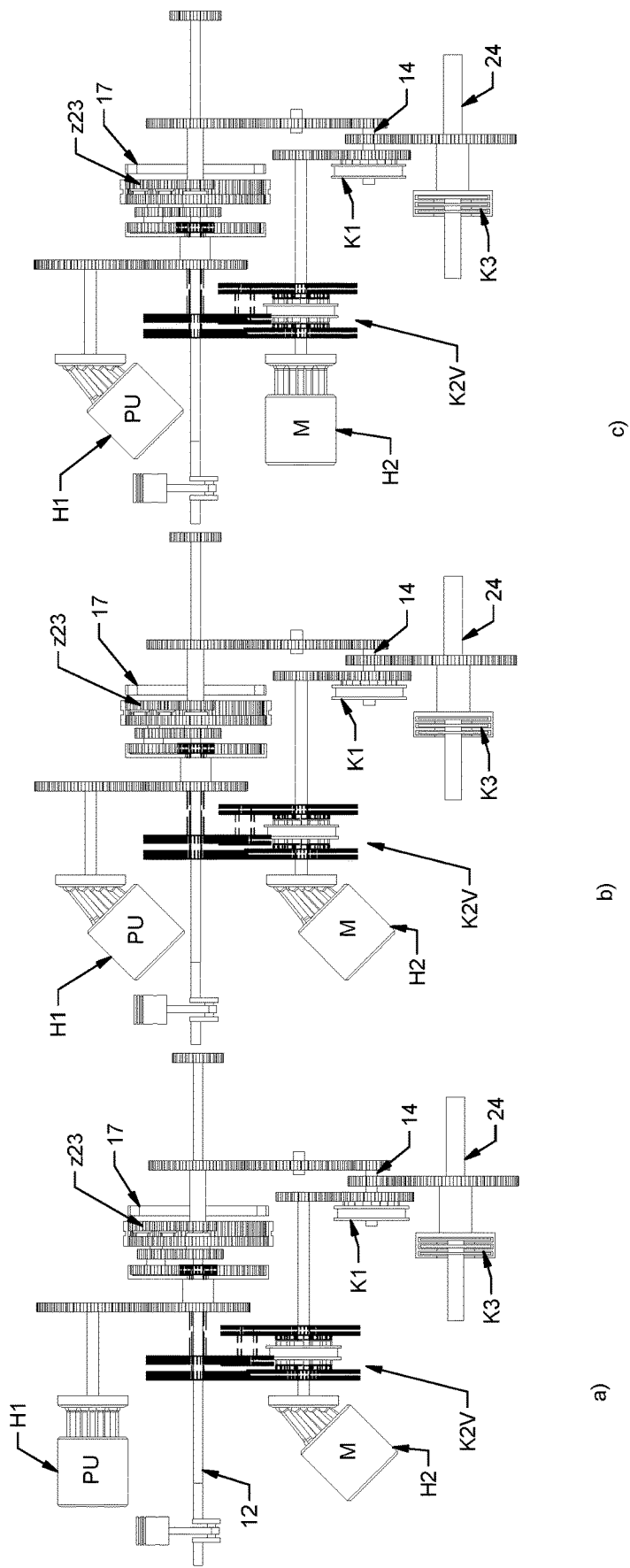
FIG. 7 in the partial illustrations a), b) and c) is a symbolization of the start-up process from the initial position shown in FIG. 6.

The forward travel range V is explained with reference to FIGS. 6 and 7. Initially, when the motor vehicle with the power split transmission 30 is stationary, the second hydraulic unit H2 is fully swung out and the first hydraulic unit H1 has a swivel angle of 0°. The first hydraulic unit H1 functions as a pump PU and the second hydraulic unit H2 as a motor M. When starting up, the first hydraulic unit H1 swivels from 0° into a positive angle range, in the embodiment example shown counterclockwise, up to its maximum swivel angle, which is 45° in the embodiment example shown in the drawings. The hydrostatic power from the first hydraulic unit H1 is supplied to the second hydraulic unit H2, which operates as a motor M, and is transmitted via the first clutch K1 to the summing shaft 14, to which power is also supplied mechanically via the first mechanical branch 16 directly via the planetary web P and the reversing planets Z20, Z21, Z22 (FIG. 6). The power flow in the closed power transmission chains is also shown symbolically in FIG. 6, with the dashed representation representing the power at the transmission input with the input shaft, the dotted representation representing the hydraulically transmitted power, the dash-dotted representation representing the mechanically transmitted power and the solid representation representing the power at the transmission output with the output shaft. The allocations are also retained in the other similar illustrations.

FIG. 7B shows the state when the first hydraulic unit H1 has reached its maximum swivel angle, whereupon the second hydraulic unit H2 swivels back to a swivel angle of 0° (FIG. 7c) and the first hydraulic unit H1 comes to a standstill. The clutches K1 and K2 run synchronously and are unloaded, whereupon the first clutch K1 is opened and the second clutch K2 is closed. As a result, the second hydraulic unit H2 is coupled to the small sun gear Z' of the planetary gear arrangement 18 via the gear transmission Z6, Z7. The power flow in the power transmission chains can be seen in FIG. 8.

By swiveling the second hydraulic unit H2 further in the opposite direction into a negative angle range, the direction of flow of the hydraulic units H1 and H2 is changed so that a change is made to a stage 2 of the forward travel range V, in which the second hydraulic unit H2 works as a pump PU and drives the first hydraulic unit H1. The hydrostatic and mechanical power are combined in the planetary gear arrangement 18 and the hydrostatically transmitted power increases. If the second hydraulic unit H2 is fully swung out, the first hydraulic unit H1 swings back to 0° (FIG. 9C), as a result of which the second hydraulic unit H2 is almost stationary and the power transmission is almost purely mechanical via the first, mechanical branch 16.

Figure 21:
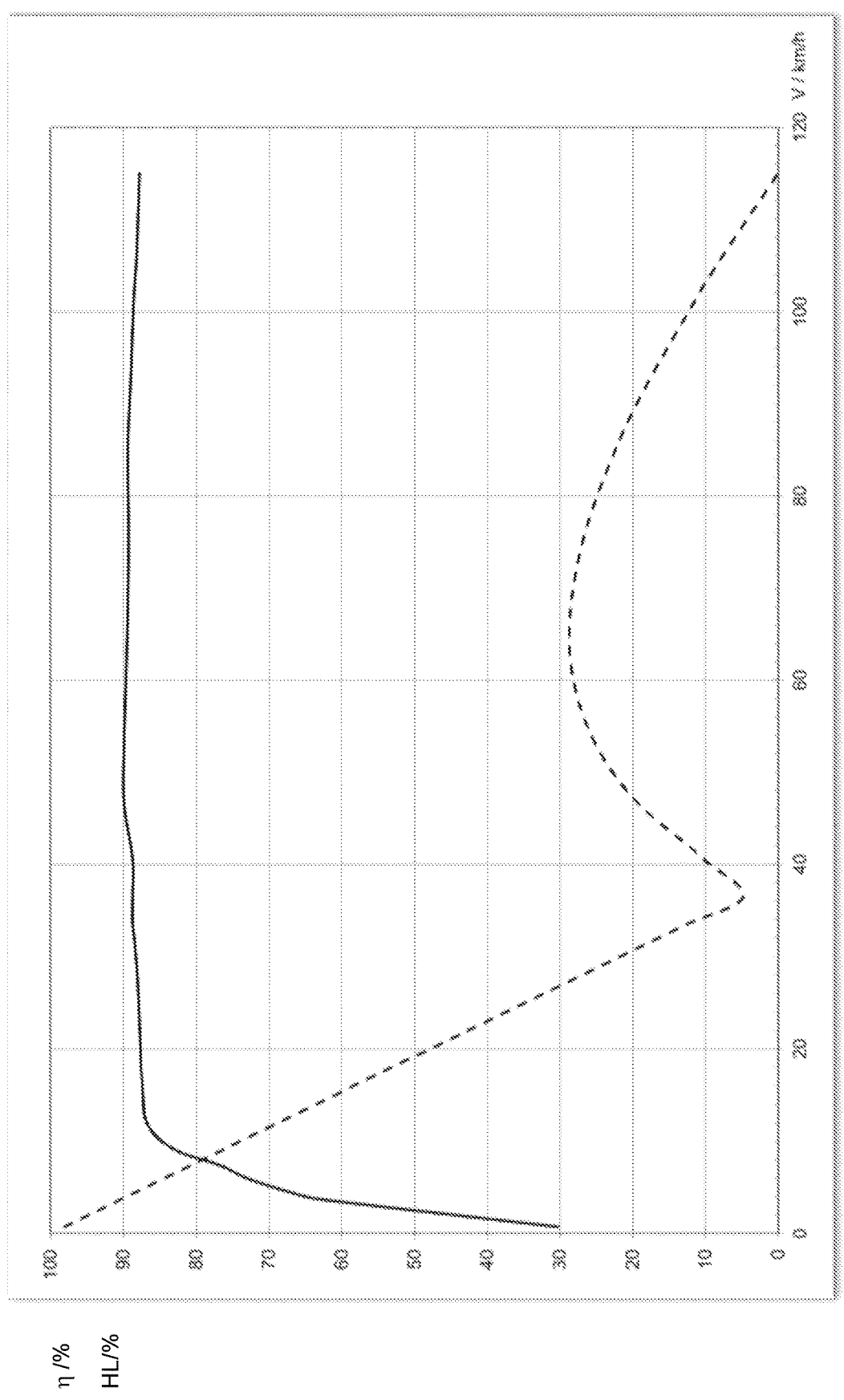
FIG. 21 is a speed-dependent illustration of the hydrostatic power component (dashed line) and the efficiency.

FIG. 21 shows the hydrostatic power component HL as a function of speed. It can be seen that when starting off, the hydrostatic power component HL is 100% and then drops almost linearly to 0%, whereby the switchover from the first stage to the second stage of the forward driving range V then takes place, whereupon the hydrostatic power component HL increases again to approx. 29% and drops again after this maximum until finally the power transmission is purely mechanical. FIG. 21 also shows the efficiency η which remains almost constant at a high level over the entire speed range.

Figure 8:
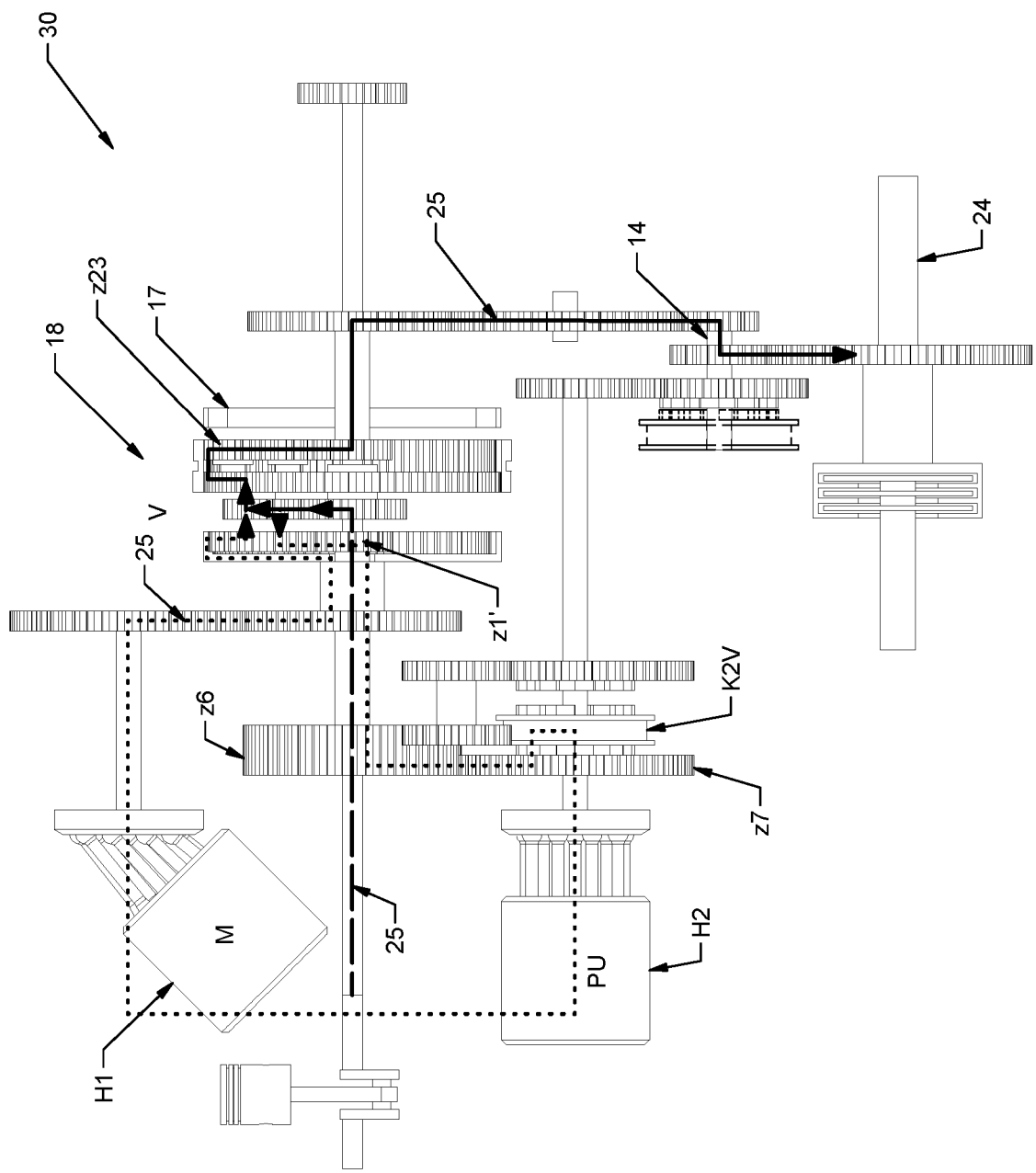
FIG. 8 is an illustration of the state shown in FIG. 7c) corresponding to FIG. 6 for the forward travel range at the transition from the first stage to the second stage.
Figure 9:
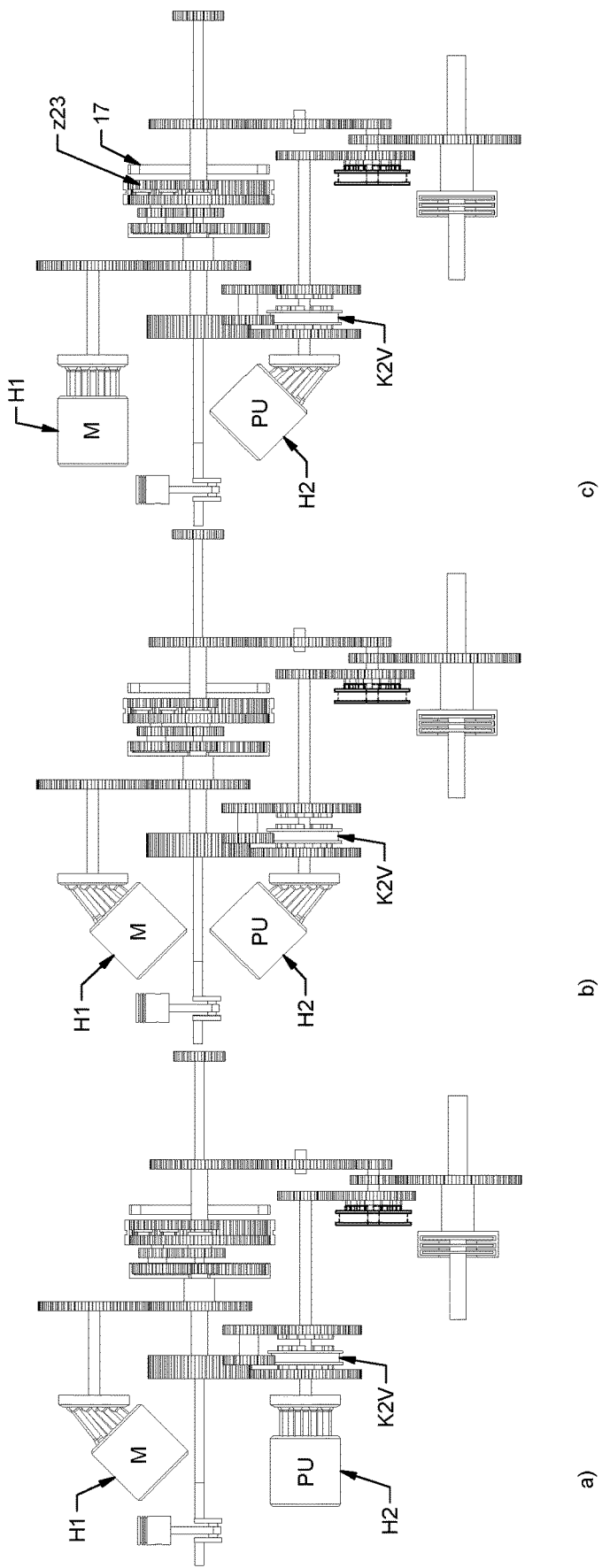
FIG. 9 is an illustration corresponding to FIG. 7 with the initial state in a) at the transition from the first stage.

For stages 1 and 2 of the forward travel range V, the power flow 25 in the power transmission chains is thus shown in FIGS. 6 and 8, with FIG. 6 showing the constellation during start-up, in which hydrostatic power is supplied from the second hydraulic unit H2 to the summing shaft 14 via the first clutch K1 and mechanical power is transmitted from the drive shaft 12 to the summing shaft 14 via the planetary gear arrangement 18. FIG. 8 shows the transition to stage 2 of the forward travel range V, in which the hydrostatically generated power is also supplied to the planetary gear arrangement 18 and from there to the summing shaft 14.

Figure 11:
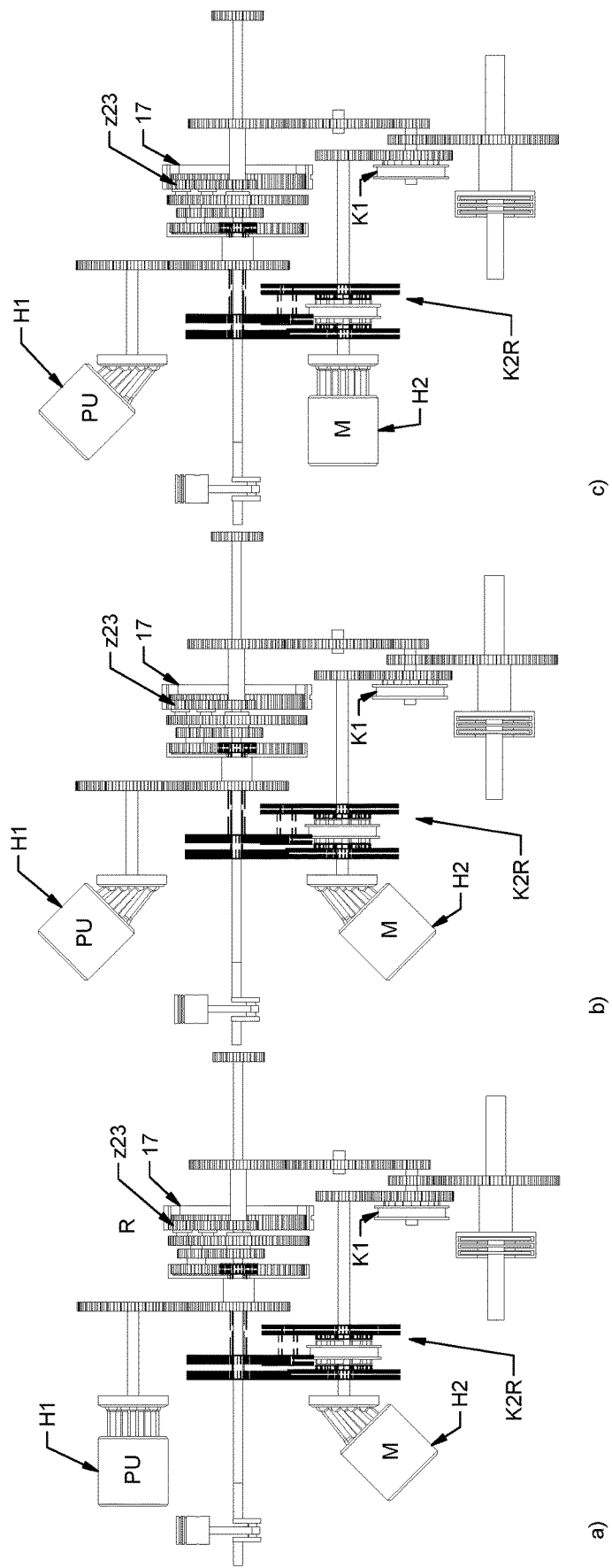
FIG. 11 is an illustration corresponding to FIG. 7 for the start-up process in the reverse direction.
Figure 12:
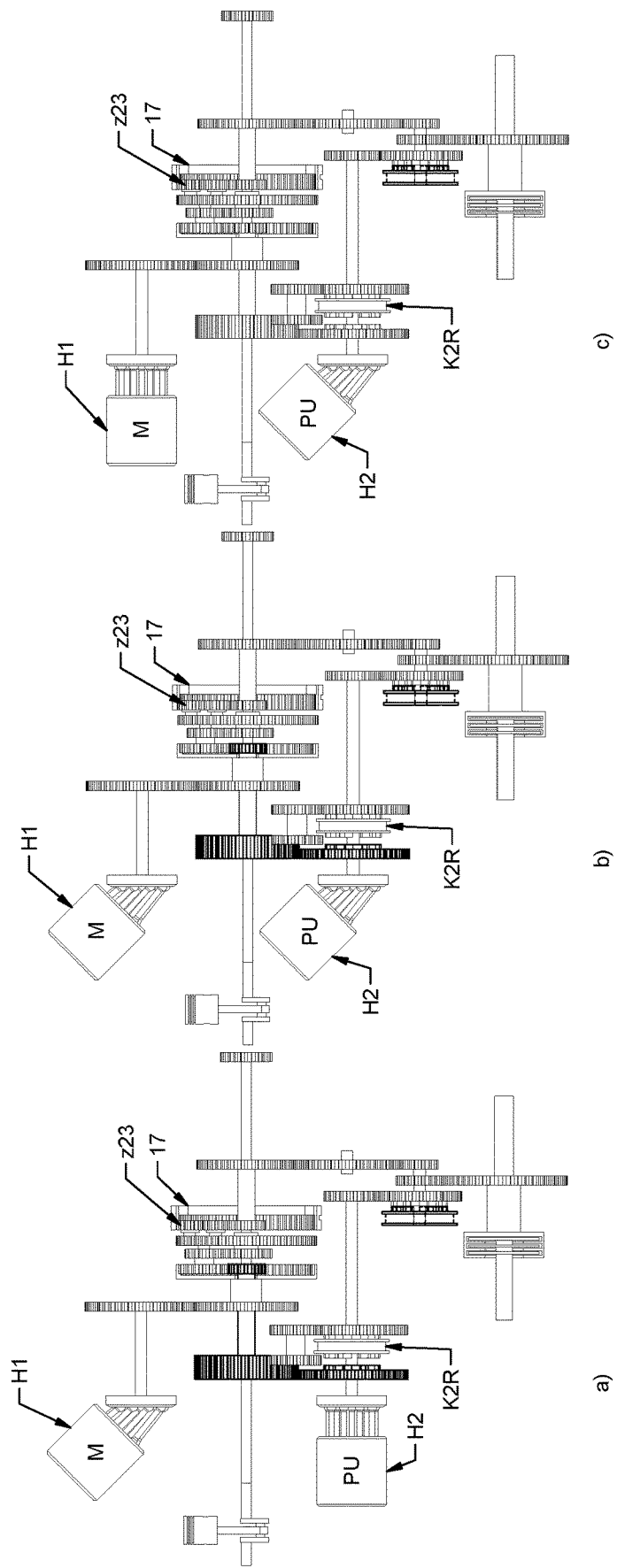
FIG. 12 is an illustration corresponding to FIG. 9 for the reverse travel range with the initial state in a) at the transition from the first stage to the second stage.

FIG. 11 shows the initial situation in sub-figure a) when starting from a standstill in the reverse travel range R. For the reverse travel range R, the reversing ring gear as a shift sleeve Z23 is fixed in the second axial position relative to the gearbox housing 17, so that the direction of rotation of the planetary web P is reversed. The second hydraulic unit H2 operates as a motor M and is fully swiveled out, while the first hydraulic unit H1 acts as a pump P and swivels clockwise from the initial position of 0° to −45°. Due to the opposite direction of rotation of the first hydraulic unit H1 into the negative angle range, the direction of rotation of the second hydraulic unit H2 is reversed and fed via the first clutch K1 with the corresponding direction of rotation to the summing shaft 14, which also receives the mechanical power component through the planetary reversing gear 15 with the reversed direction of rotation.

Figure 10:
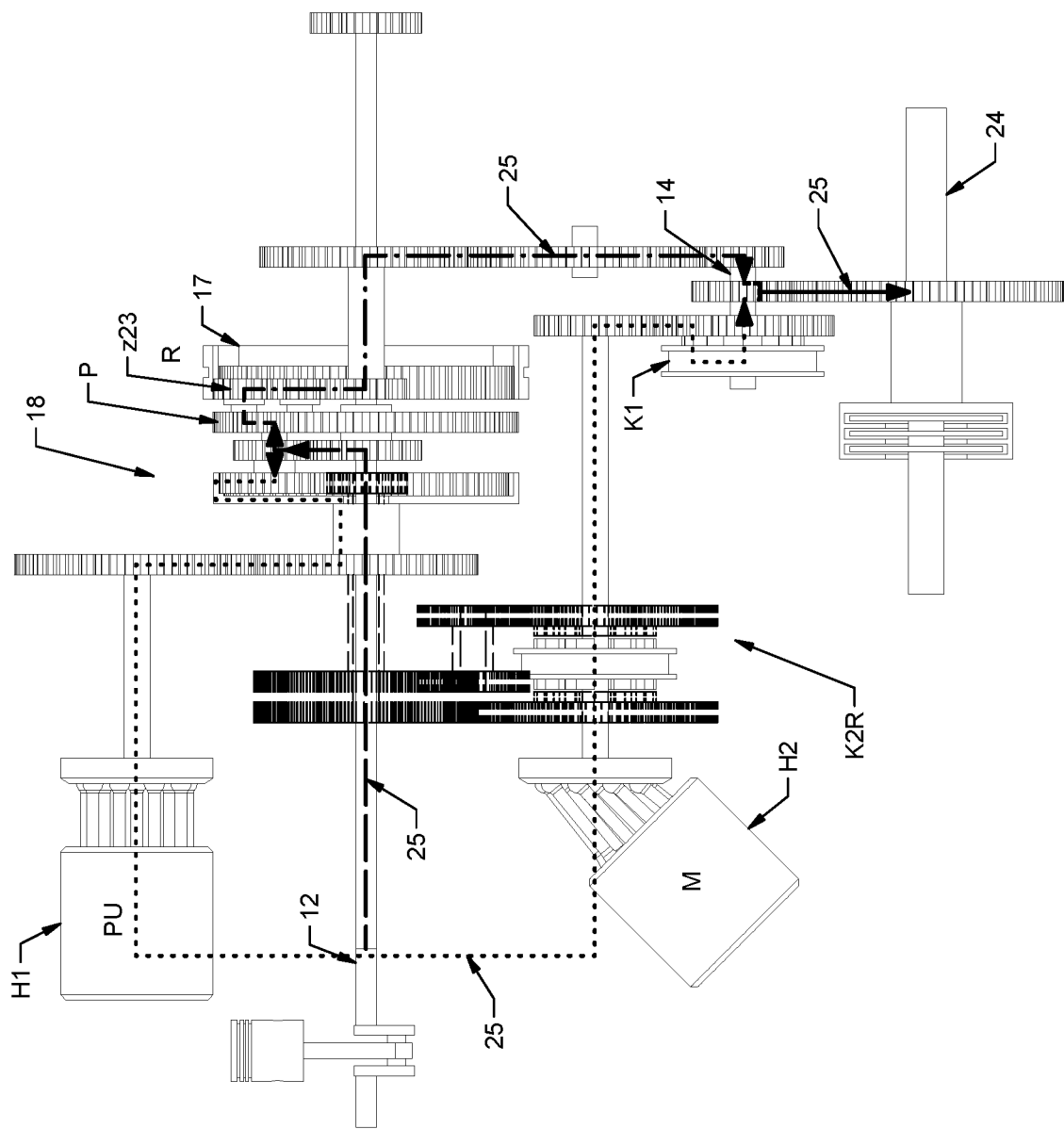
FIG. 10 is an illustration corresponding to FIG. 6 with the corresponding swivel angle of the two hydraulic units for starting in a reverse travel range and the symbolic illustration of the power flow in the closed power transmission chains, with the shift sleeve of the planetary reversing gear shifted in relation to FIG. 6 for the reverse travel range.
Figure 13:
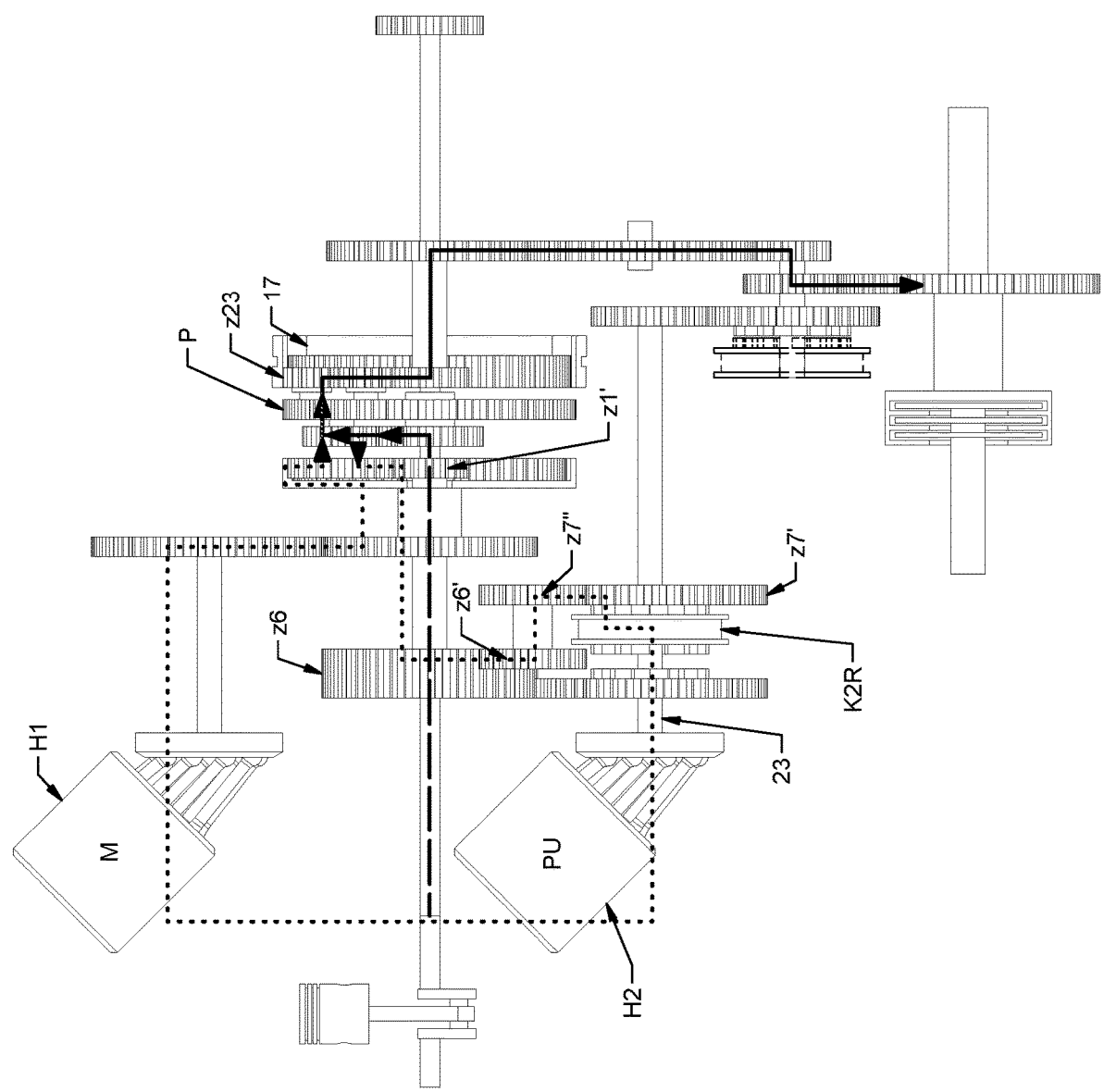
FIG. 13 is a symbolic illustration corresponding to FIG. 6 of the force flow in the state shown in FIG. 12b).
Figure 14:
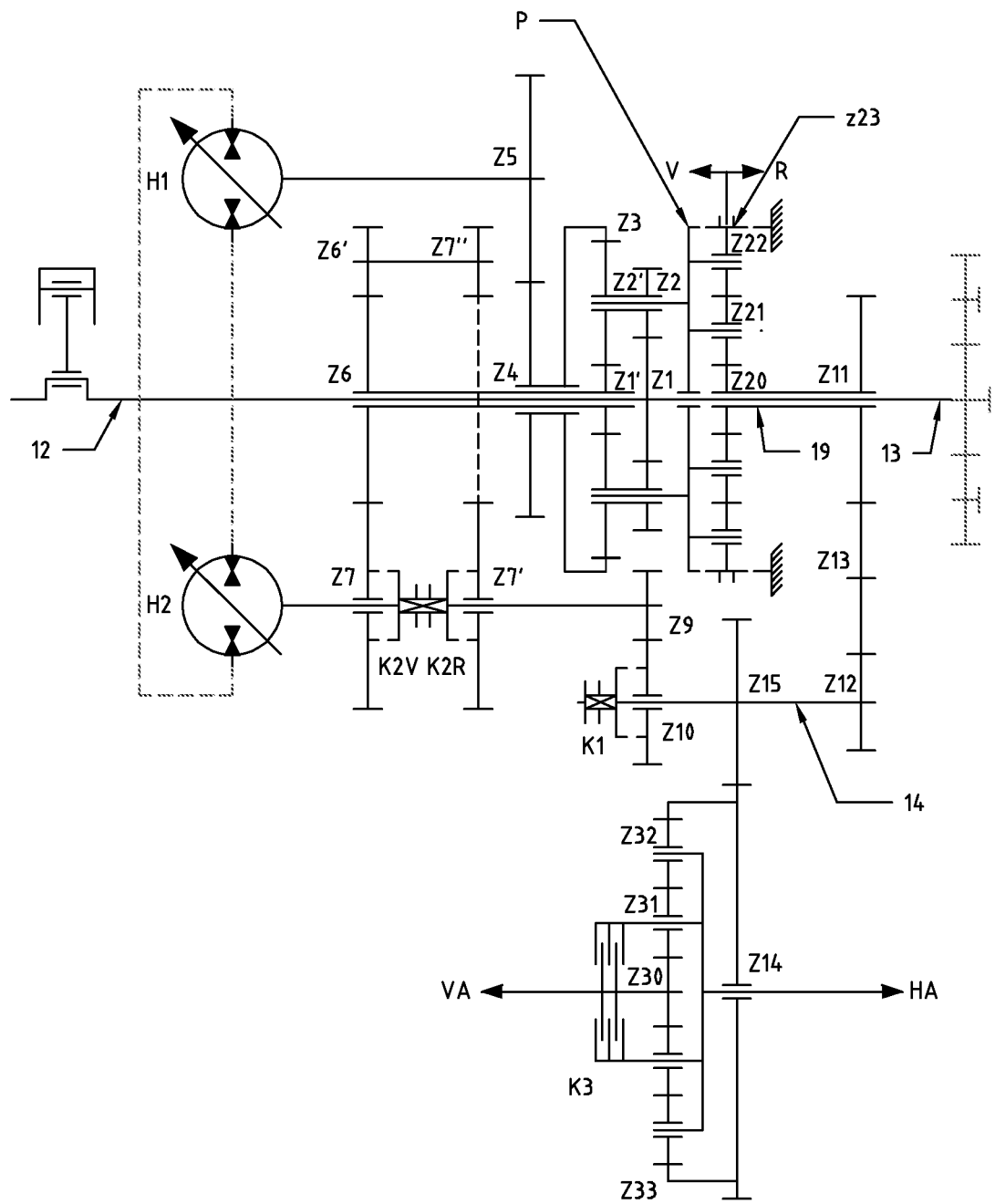
FIG. 14 is a transmission diagram of the power split transmission from FIG. 1.

The power flows can be seen in FIGS. 10 and 13, which, in comparison with FIGS. 6 and 8, show that in the forward travel range V and in the reverse travel range R the merging of the power components is basically the same, with FIG. 13 showing the use of the second gear transmission Z7', Z7'', Z6', Z6 via the double claw clutch K2V/K2R in position K2R.

Figure 15:
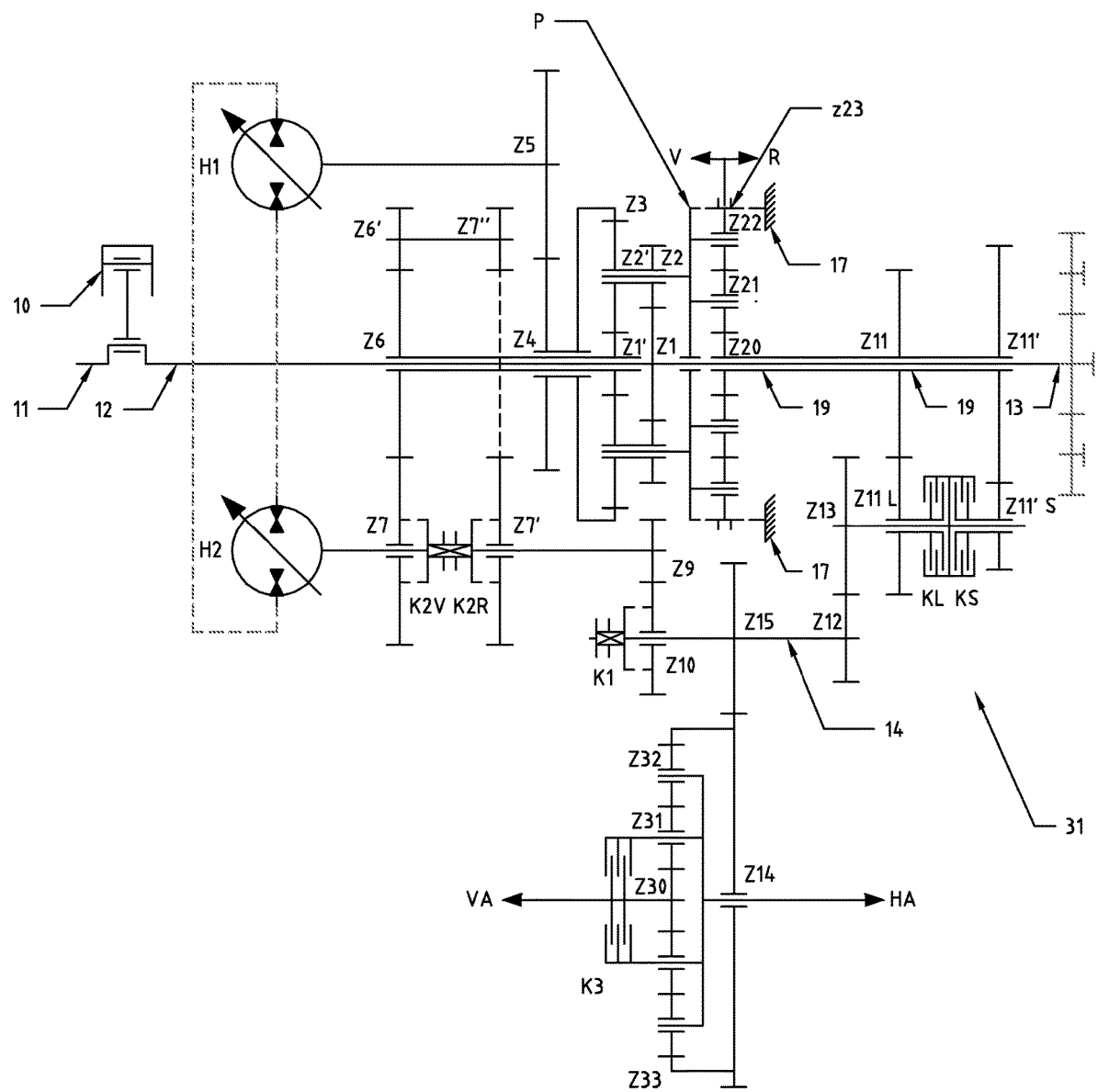
FIG. 15 is an illustration corresponding to FIG. 14 with an additional gear stage comprising two multi-plate clutches to provide a further stage.

FIG. 15 shows an embodiment in which an additional gear stage 31 with two clutches KS and KL is used in stage 2, both for the forward travel range V and the reverse travel range R, via the coupling shaft 19 in order to extend the operating range. At the end of stage 2, clutch KL is opened and clutch KS is closed; during the changeover time from clutch KL to clutch KS, the first hydraulic unit H1 is swiveled from 0° in the direction of 45°. Once clutches KL and KS have reached synchronous speed, the first hydraulic unit H1 is swiveled back to 0°.

Figure 16:
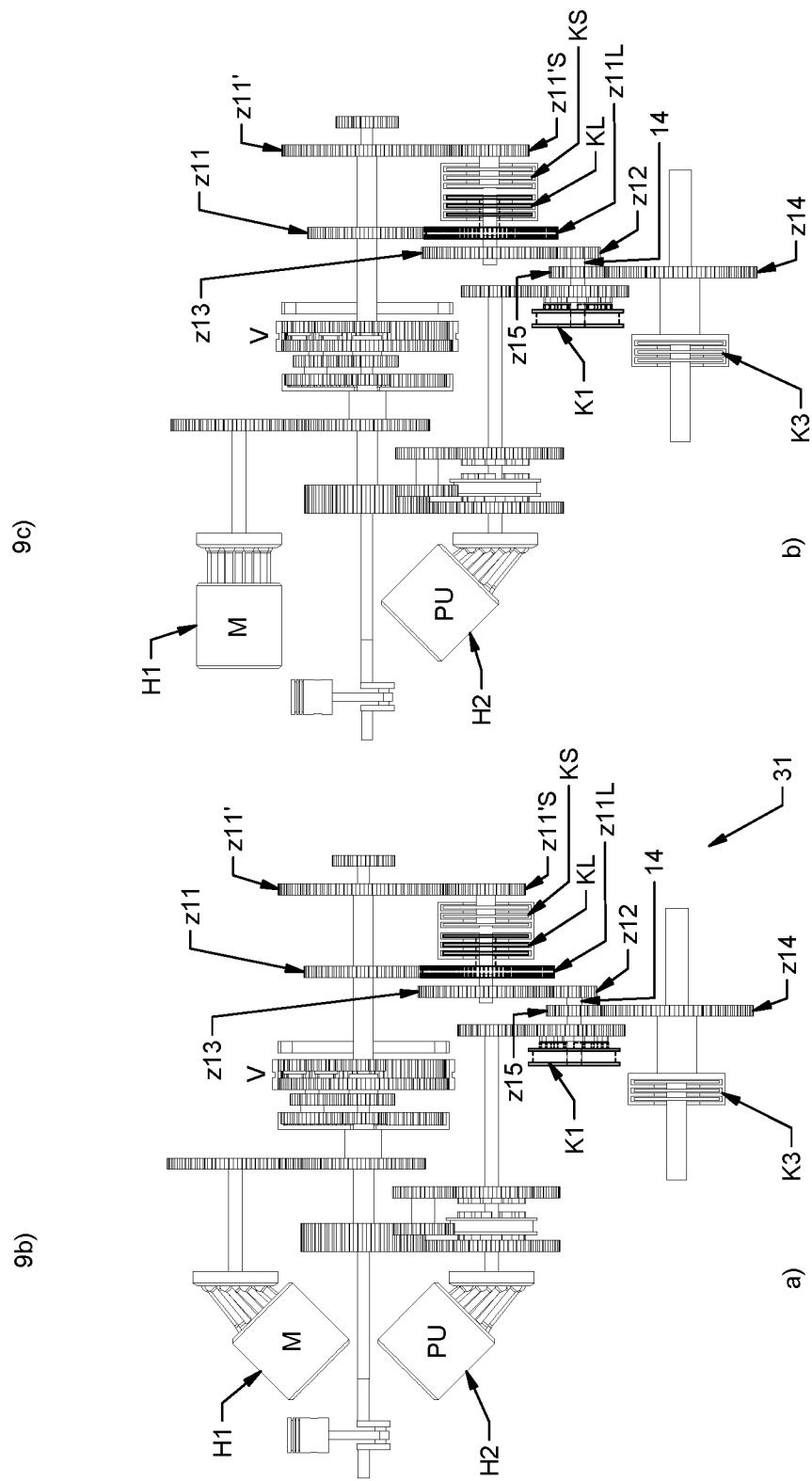
FIG. 16 for the forward travel range: partial illustration a) is an illustration corresponding to FIG. 9b) with the additional gear stage and partial illustration b) is an illustration corresponding to FIG. 9c) with the additional gear stage.
Figure 17:
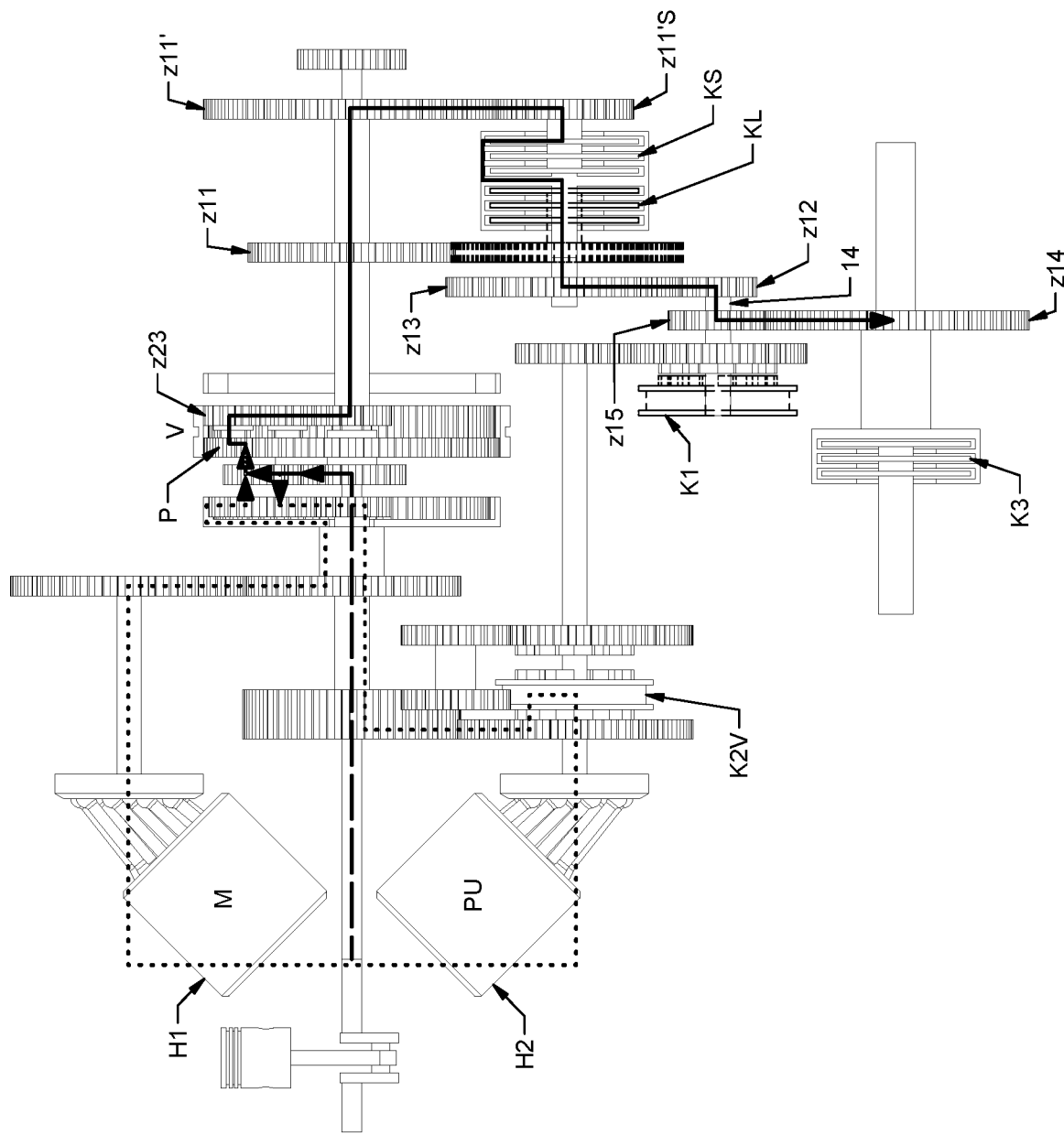
FIG. 17 is a symbolic illustration corresponding to FIG. 6, of the force flow in the closed force transmission chains according to FIG. 16a).

FIG. 16 and FIG. 17 show the use of the additional transmission stage 31 in the forward travel range V. At the end of the second stage, the clutch KL is opened and the clutch KS is closed, whereby during the changeover from the clutch KL to the clutch KS, the first hydraulic unit H1 is pivoted from 0° in the direction of 45°. As soon as the clutch KS and the clutch KL have reached the synchronous speed, the first hydraulic unit H1 swivels back to 0°. As the second hydraulic unit H2 is fully swiveled out, it is almost stationary and the power transmission is almost purely mechanical (FIG. 17).

Figure 18:
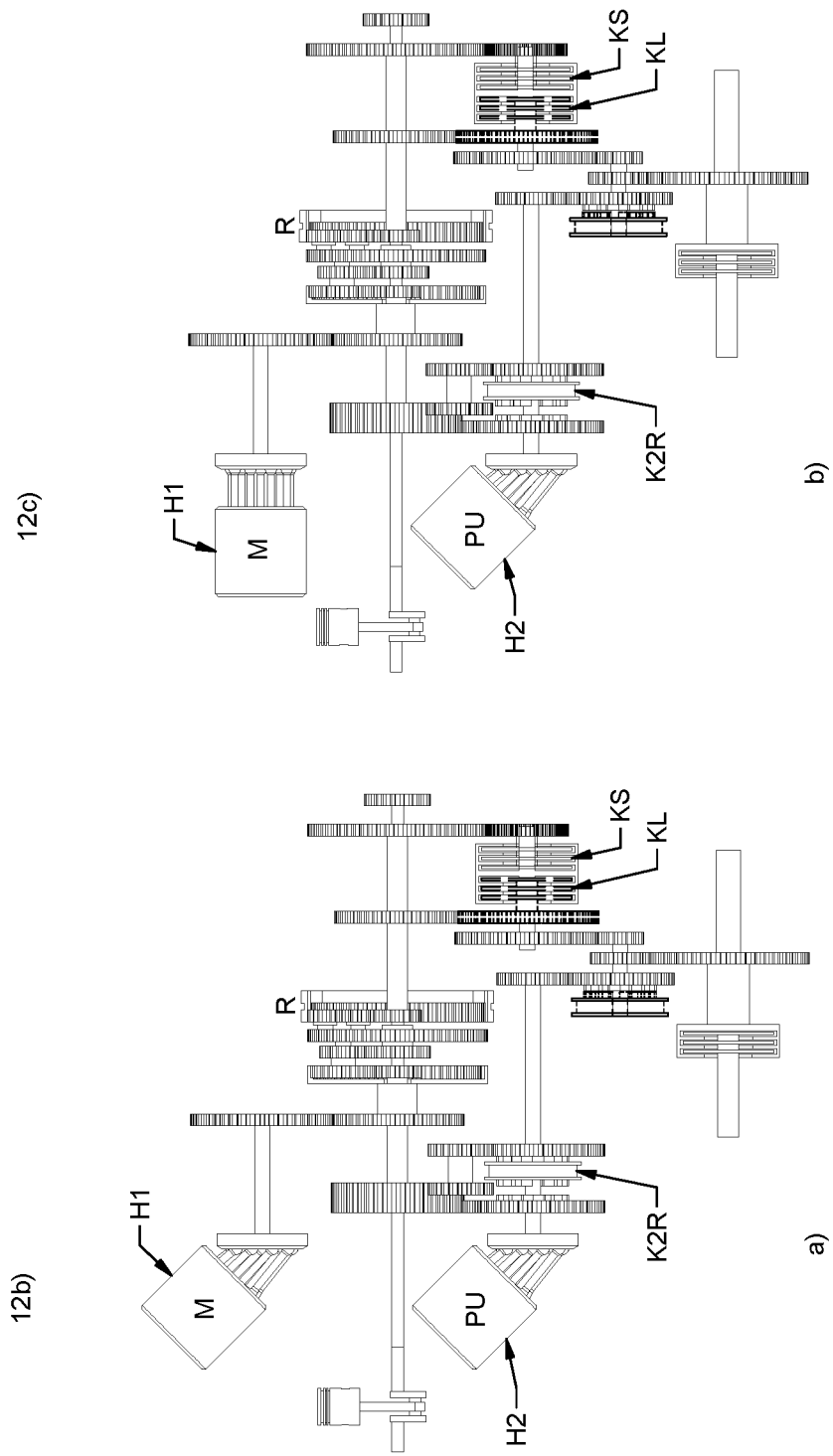
FIG. 18 for the reverse travel range: partial illustration a) is an illustration corresponding to FIG. 12b) with the additional gear stage and partial illustration b) is an illustration corresponding to FIG. 12c) with the additional gear stage.

FIGS. 18 and 19 show the conditions when using the additional gear stage 31 in the reverse travel range R at the end of the second stage, whereby it should be noted that the swivel direction of the first hydraulic unit H1 is inverted with respect to the forward travel range V.

REFERENCE LIST 10 piston
11 crankshaft
12 drive shaft
13 journal shaft
14 summing shaft
15 planetary reversing gear
16 first, mechanical branch
17 transmission housing
18 planetary gear arrangement
19 coupling shaft
20 planetary web
21 piston
22 second branch: hydraulic
23 hydrostatic shaft
24 output shaft
25 power flow
30 power split transmission
31 additional gear stage
K1 first clutch
K2 second clutch
K3 third clutch
KS clutch for additional step
KL additional clutch for additional stage
K2V/K2R double claw clutch
HA rear axle
VA front axle
HL hydrostatic power share
$\eta$ efficiency
V forward travel range
R reverse driving range
M motor
PU pump
K2V first closed position of the double claw clutch for V
K2R second closed position of the double claw clutch for R
H1 first hydraulic unit
H2 second hydraulic unit
P planetary web
Z1 large sun gear
Z1' small sun gear
Z2 double planetary gear
Z2' double planetary gear
Z3 first ring gear
Z4 gear wheel on the outer ring of Z3
Z5 gearwheel for H1
Z6, Z7 first gear transmission
Z7', Z7'', Z6', Z6 second gear transmission
Z9, Z10 gears between 23 and K1
Z11 gear assigned to the coupling shaft
Z12 gear wheel of the first, mechanical branch
Z13 adjacent gear
Z11' first supplementary gear
Z11'S second supplementary gear
Z11L third supplementary gear
Z20, Z21, Z22 reversing planet
Z23 shift sleeve/reversible ring gear
Z30, Z31, Z32, Z33 differential lock Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power split transmission, comprising:
a drive shaft;
a first mechanical branch;
a planetary gear arrangement with at least two sun gears, including a large sun gear and a small sun gear, a first ring gear and a planetary web on which double planetary gears are arranged, which mesh with the sun gears and with the first ring gear, at least one of the sun gears being coupled to the drive shaft; and a continuously variable second branch which can be connected at least partially to the first mechanical branch via the planetary gear arrangement and comprises at least two adjustable hydraulic units which can be energetically coupled to one another and can be operated in each case in both directions as a motor or pump, wherein a first hydraulic unit of the at least two hydraulic units is coupled to the first ring gear by way of a first gear wheel and a second gear wheel on an outer rim of the first ring gear; and an output shaft which can be coupled to the drive shaft via the first mechanical branch and the second branch;

wherein the planetary gear arrangement includes a planetary reversing gear by which the direction of rotation of the first mechanical branch can be reversed;

wherein the planetary reversing gear is formed as a reversing hollow gear and has an axially adjustable shift sleeve, wherein in a first axial position, the shift sleeve transmits the direction of rotation of the planetary web directly to a reversing planet which, in the first mechanical branch, is non-positively connected to a summing shaft by way of three gear wheels including a first gear wheel associated with a coupling shaft of the first mechanical branch and a second adjacent gear wheel, wherein in a second axial position, the shift sleeve is directly or indirectly blocked against rotation relative to a gear housing of the power split transmission, such that the direction of rotation of the planetary web is reversed and acts with a reversed direction of rotation on the summing shaft, and wherein the power of the first mechanical branch and the second branch are combined via the summing shaft.

2. The power split transmission according to claim 1, wherein the shift sleeve is formed as a ring gear with a reversing planet gear arrangement including an odd number of gears.

3. The power split transmission according to claim 2, wherein the radially inner gear wheel of the odd number of gears of the reversing planet gear arrangement of the shift sleeve is non-rotatably connected to the first mechanical branch by the coupling shaft.

4. The power split transmission according to claim 3, wherein the coupling shaft is designed as a hollow shaft and surrounds a journal shaft connected to the drive shaft.

5. The power split transmission according to claim 1, wherein the first mechanical branch is connected or connectable in the direction of the power flow downstream of the planetary reversing gear and the second branch is connected or connectable via a first clutch to the summing shaft, which is connected to the output shaft.

6. The power split transmission according to claim 5, wherein the first mechanical branch is connected on the output side of the coupling shaft to the summing shaft via an odd number of gears.

7. The power split transmission according to claim 6, wherein a second clutch is assigned to the second branch.

8. The power split transmission according to claim 7, wherein the first clutch is designed as a claw clutch assigned to the summing shaft for detachable interaction with a hydrostatic shaft of a second hydraulic unit of the at least two hydraulic units.

9. The power split transmission according to claim 8, wherein the second clutch is assigned to the hydrostatic shaft of the second hydraulic unit and is designed as a double claw clutch for interaction of the second hydraulic unit via a first gear transmission with the small sun gear in the first closed position and for interacting via a second gear transmission with the small sun gear in the second closed position.

10. The power split transmission according to claim 6, wherein an additional gear stage is arranged between the first gear wheel coupled to the coupling shaft and an adjacent gear wheel adjacent to the gear wheel coupled to the coupling shaft, the additional gear stage detachably couples a first supplementary gear wheel associated with the coupling shaft to the adjacent gear wheel via two clutches and a second supplementary gear wheel and a third supplementary gear wheel.

11. A motor vehicle with a power split transmission according to claim 1.

12. A method for operating a power split transmission comprising a drive shaft, a first mechanical branch, a planetary gear arrangement with at least two sun gears, a first ring gear and a planetary web on which double planetary gears are arranged, which mesh with the sun gears and with the first ring gear, at least one of the sun gears being coupled to the drive shaft, a continuously variable second branch which can be connected at least partially to the first mechanical branch via the planetary gear arrangement and comprises at least two adjustable hydraulic units which can be energetically coupled to one another and can be operated in each case in both directions as a motor or pump, and an output shaft which can be coupled to the drive shaft via the first mechanical branch and the second branch, wherein the planetary gear arrangement includes a planetary reversing gear by which the direction of rotation of the first mechanical branch can be reversed, wherein the planetary reversing gear has an axially adjustable shift sleeve, wherein in a first axial position, the shift sleeve transmits the direction of rotation of the planetary web directly to a reversing planet which, in the first mechanical branch, is non-positively connected to a summing shaft by way of three gear wheels including a first gear wheel associated with a coupling shaft of the first mechanical branch and a second adjacent gear wheel, and wherein in a second axial position, the shift sleeve is directly or indirectly blocked against rotation relative to a gear housing of the power split transmission, such that the direction of rotation of the planetary web is reversed and acts with a reversed direction of rotation on the summing shaft, wherein the power of the first mechanical branch and the second branch are combined via the summing shaft, wherein the method comprises:

in a forward driving range, displacing the shift sleeve into the first axial position which is not fixed in terms of rotation relative to the transmission housing, wherein a first hydraulic unit of the two hydraulic units is coupled to the first ring gear via a first gear wheel and a second gear wheel on an outer rim of the first ring gear, wherein a second hydraulic unit of the two hydraulic units is coupled to a summing shaft via a first clutch, a third gear wheel and a fourth gear wheel, wherein the first hydraulic unit is pivoted from a pivoting position with a pivoting angle of 0° in a first pivoting direction into a positive angular range and is operated as a pump, and wherein the second hydraulic unit is operated as a motor.

13. The method according to claim 12, wherein, in a second stage of the forward travel range, the first hydraulic unit is operated as a motor and the second hydraulic unit is operated as a pump, in that the second hydraulic unit is coupled to a first sun gear of the at least two sun gears via a second clutch and a first gear transmission and is pivoted from a pivoting position of 0° into a negative angular range.

14. A method for operating a power split transmission comprising a drive shaft, a first mechanical branch, a planetary gear arrangement with at least two sun gears, a first ring gear and a planetary web on which double planetary gears are arranged, which mesh with the sun gears and with the first ring gear, at least one of the sun gears being coupled to the drive shaft, a continuously variable second branch which can be connected at least partially to the first mechanical branch via the planetary gear arrangement and comprises at least two adjustable hydraulic units which can be energetically coupled to one another and can be operated in each case in both directions as a motor or pump, and an output shaft which can be coupled to the drive shaft via the first mechanical branch and the second branch, wherein the planetary gear arrangement includes a planetary reversing gear by which the direction of rotation of the first mechanical branch can be reversed, wherein the planetary reversing gear has an axially adjustable shift sleeve, wherein in a first axial position, the shift sleeve transmits the direction of rotation of the planetary web directly to a reversing planet which, in the first mechanical branch, is non-positively connected to a summing shaft by way of three gear wheels including a first gear wheel associated with a coupling shaft of the first mechanical branch and a second adjacent gear wheel, and wherein in a second axial position, the shift sleeve is directly or indirectly blocked against rotation relative to a gear housing of the power split transmission, such that the direction of rotation of the planetary web is reversed and acts with a reversed direction of rotation on the summing shaft, wherein the power of the first mechanical branch and the second branch are combined via the summing shaft, wherein the method comprises:

in a reverse travel range, moving the shift sleeve into the second axial position in which the shift sleeve is fixed against rotation relative to the transmission housing, wherein a first hydraulic unit of the two hydraulic units is operated as a pump and a second hydraulic unit of the two hydraulic units is operated as a motor, and wherein the first hydraulic unit is pivoted from a pivoting position of 0° into a second pivoting direction into a negative angular range.

15. The method according to claim 14, wherein in a second stage of the reverse travel range, the first hydraulic unit is operated as a motor and the second hydraulic unit is operated as a pump, in that the second hydraulic unit is coupled to a first sun gear of the at least two sun gears via a second clutch and a second gear transmission and is pivoted from a pivoting position of 0° into a negative angular range.

* * * * *